United States Patent
Lebron et al.

(10) Patent No.: US 11,001,965 B2
(45) Date of Patent: May 11, 2021

(54) TEXTILE PRINTING WITH INKJET INKS

(71) Applicant: HEWLETT-PACKARD DEVELOPMENT COMPANY, L.P., Spring, TX (US)

(72) Inventors: Hector Lebron, San Diego, CA (US); Raffaella Fior, San Diego, CA (US); Stephen G. Rudisill, San Diego, CA (US); Jesiska Tandy, San Diego, CA (US); Alexey S. Kabalnov, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/607,812

(22) PCT Filed: Apr. 16, 2018

(86) PCT No.: PCT/US2018/027800
§ 371 (c)(1),
(2) Date: Oct. 24, 2019

(87) PCT Pub. No.: WO2019/203793
PCT Pub. Date: Oct. 24, 2019

(65) Prior Publication Data
US 2021/0040686 A1  Feb. 11, 2021

(51) Int. Cl.
*D06P 5/00* (2006.01)
*D06P 5/30* (2006.01)
(Continued)

(52) U.S. Cl.
CPC ............ *D06P 5/30* (2013.01); *B41M 5/0023* (2013.01); *B41M 5/0064* (2013.01);
(Continued)

(58) Field of Classification Search
CPC .......... D06P 5/30; D06P 5/2077; D06P 5/001; D06P 5/2083; D06P 3/528; B41M 5/0047;
(Continued)

(56) References Cited

U.S. PATENT DOCUMENTS 3,909,328 A  9/1975  Dessauer et al.
4,589,884 A  5/1986  Gilpatrick
(Continued)

FOREIGN PATENT DOCUMENTS

CN  103450740 A  12/2013
WO  WO2001086054 A1  11/2001
(Continued)

OTHER PUBLICATIONS

Broadbent Arthur D et al. "Continuous Dyeing of Cotton with Reactive Dyes Using Infrared Heat" Apr. 21, 2005 IECRes https://pubs.acs.org/doi/abs/10.1021/ie040288r.
(Continued)

*Primary Examiner* — Eisa B Elhilo
(74) *Attorney, Agent, or Firm* — Dierker & Kavanaugh PC

(57) ABSTRACT

A printing method includes selecting an inkjet ink including a dye, and selecting an active agent, including an electromagnetic radiation-absorbing active material, and an aqueous or non-aqueous vehicle. The method further includes inkjet printing the dye sublimation inkjet ink and the active agent directly onto a textile fabric. The textile fabric having the ink and active agent thereon is exposed to electromagnetic radiation.

16 Claims, 3 Drawing Sheets

(51) Int. Cl.
*B41M 5/00* (2006.01)
*B41M 7/00* (2006.01)
*C09D 11/328* (2014.01)
*C09D 11/38* (2014.01)
*D06P 5/20* (2006.01)

(52) U.S. Cl.
CPC .......... *B41M 7/009* (2013.01); *B41M 7/0081* (2013.01); *C09D 11/328* (2013.01); *C09D 11/38* (2013.01); *D06P 5/001* (2013.01); *D06P 5/2077* (2013.01); *D06P 5/2083* (2013.01); *D10B 2331/04* (2013.01)

(58) Field of Classification Search
CPC .. B41M 7/009; B41M 7/0081; B41M 5/0088; B41M 5/0023; C09D 11/328; D10B 2331/04
USPC ............................................................ 8/471
See application file for complete search history.

(56) References Cited

U.S. PATENT DOCUMENTS

| | | |
|---|---|---|
| 4,680,032 A | 7/1987 | Arnott |
| 2003/0104314 A1 | 6/2003 | Zheng et al. |
| 2005/0274274 A1* | 12/2005 | Gore ................... C09B 67/0077 101/491 |
| 2010/0263571 A1 | 10/2010 | Vonwiller et al. |
| 2015/0307728 A1 | 10/2015 | Omenetto et al. |
| 2017/0029637 A1* | 2/2017 | Loccufier ............ C09B 67/0097 |
| 2017/0218565 A1 | 8/2017 | Loccufier |

FOREIGN PATENT DOCUMENTS

| | | |
|---|---|---|
| WO | WO2015158592 A1 | 10/2015 |
| WO | WO2017047736 A1 | 3/2017 |
| WO | WO2017069778 A1 | 4/2017 |
| WO | WO2019094006 A1 | 5/2019 |
| WO | WO2019094007 A1 | 5/2019 |
| WO | WO2019094010 A1 | 5/2019 |

OTHER PUBLICATIONS

Paul Debasree et al. "Effect of Temperature on Dyeing Cotton Knitted Fabrics with Reactive Dyes" Dec. 2017 JSAER; ISSN: 2394-2630.

* cited by examiner

TEXTILE PRINTING WITH INKJET INKS

BACKGROUND

Textile printing methods often include rotary and/or flat-screen printing. Traditional analog printing typically involves the creation of a plate or a screen, i.e., an actual physical image from which ink is transferred to the textile. Both rotary and flat screen printing have great volume throughput capacity, but also have limitations on the maximum image size that can be printed. For large images, pattern repeats are used. Conversely, digital inkjet printing enables greater flexibility in the printing process, where images of any desirable size can be printed immediately from an electronic image without pattern repeats. Inkjet printers are gaining acceptance for digital textile printing. Inkjet printing is a non-impact printing method that utilizes electronic signals to control and direct droplets or a stream of ink to be deposited on media.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Textile printing processes rely on post-printing (post-processing) methods for colorant-to-fabric sublimation. Post-processing methods, such as, e.g., calendaring, use secondary (non-printing) hardware to apply heat and/or pressure for an amount of time sufficient to drive colorant sublimation into textile fibers. These post-processing methods render printed textiles with desired color attributes and durability performance.

In contrast, examples of textile printing methods of the present disclosure do not involve post-processing. Examples of the printing methods disclosed herein include the discrete placement of an active agent (e.g., an infrared (IR) absorbing inkjet fluid) to drive localized heat generation within textile fibers to drive a local colorant sublimation. Examples of the printing methods disclosed herein include the ability to adjust the active agent concentration to modulate heat intensity and balance out/compensate for different properties of various colorants. As such, according to example printing methods, textiles are printed and exposed to an energy source (such as, e.g., an IR lamp) within the printing system without additional/secondary post-printing (post-processing) methods.

Figure 1:
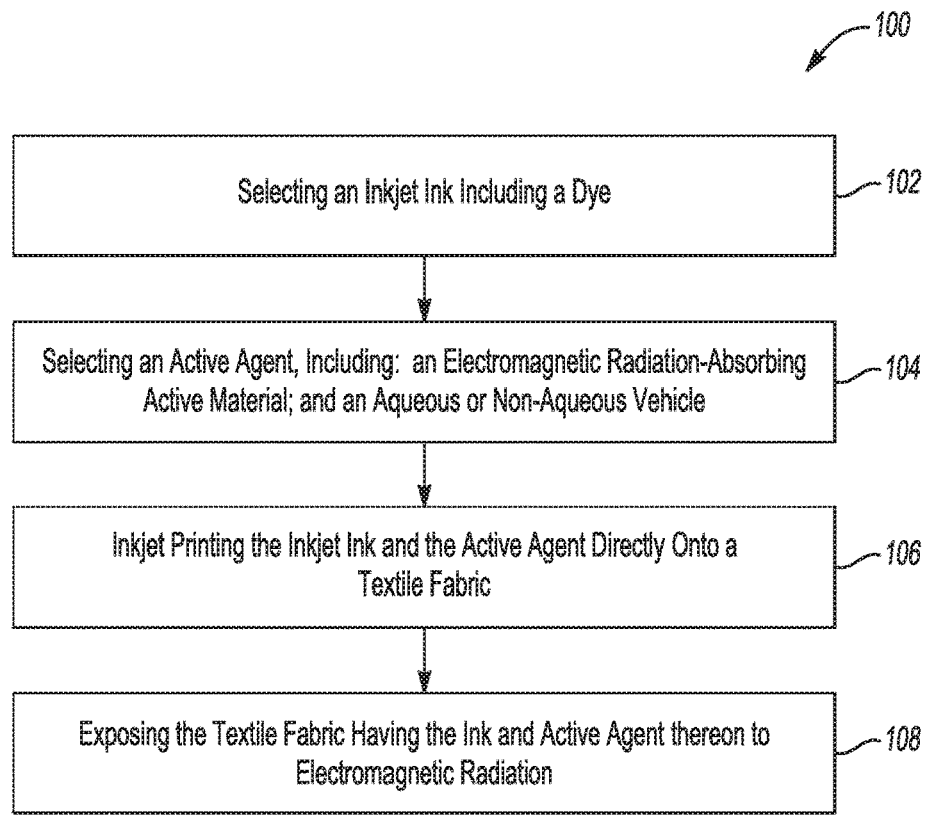
FIG. 1 is a flow diagram illustrating an example of a printing method.

Referring now to FIG. 1, an example of a printing method 100 comprises:

selecting an inkjet ink including a dye (as shown at reference numeral 102);

selecting an active agent, including: an electromagnetic radiation-absorbing active material; and an aqueous or non-aqueous vehicle (as shown at reference numeral 104);

inkjet printing the inkjet ink and the active agent directly onto a textile fabric (as shown at reference numeral 106); and exposing the textile fabric having the ink and active agent thereon to electromagnetic radiation (as shown at reference numeral 108).

The exposing of the fabric having the ink and active agent thereon raises the temperature of the fabric to a temperature sufficient to open up the fibers of the textile substrate and allow the inkjet ink (e.g., a dye sublimation inkjet ink) to migrate into the fibers. The dye then re-solidifies on the fibers of the textile substrate, which renders the printed image durable, wash-resistant, and colorfast.

A liquid fluid set for dye sublimation inkjet printing comprises:

a dye sublimation inkjet ink 24; and an active agent 26, including: an electromagnetic radiation-absorbing active material; and an aqueous or non-aqueous vehicle.

Figure 2:
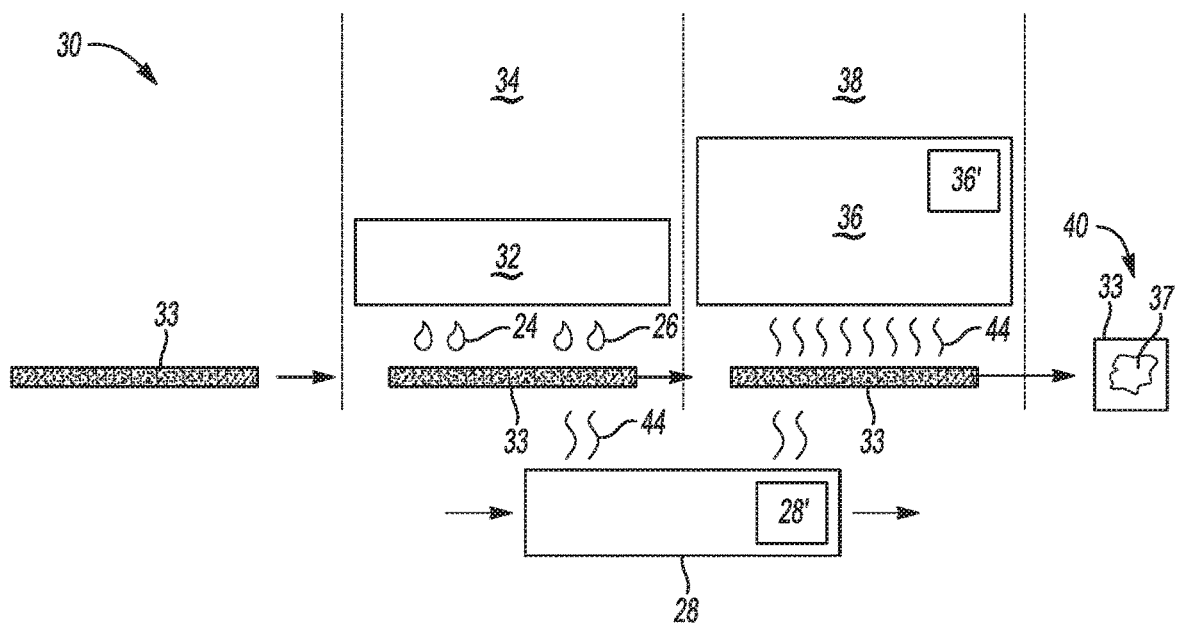
FIG. 2 is a schematic diagram of an example of a printing system.

Referring now to FIG. 2, a schematic diagram of a printing system 30 includes an inkjet printer 32 in a printing zone 34 of the printing system 30 and a source 36 of radiation 44 positioned in a sublimation zone 38 of the printing system 30.

In an example, a textile fabric/substrate 33 may be transported through the printing system 30 along the path shown by the arrows in FIG. 2 such that the textile substrate 33 is first fed to the printing zone 34 where an example of a dye sublimation inkjet ink 24 is inkjet printed directly onto the textile substrate 33 by the inkjet printer 32 (for example, from a piezo- or thermal-inkjet printhead) to form an ink layer on the textile substrate 33. An active agent 26 is also inkjet printed (before, simultaneously with, or after) on or under the ink layer. The textile substrate 33 having the ink layer and active agent disposed thereon may then be transported to the sublimation zone 38 where the ink layer/active agent is exposed to electromagnetic radiation 44. In an example, the exposing to electromagnetic radiation provides discrete, localized heating from the active agent 26 to accomplish sublimation of the dye sublimation inkjet ink 24 into the textile fabric 33, to form a printed image 37. The sublimation of the dye 24 (causing it to penetrate into the textile substrate 33) forms a printed article 40 including the image 37 formed on the textile substrate 33.

In an example, the active agent 26 may be printed first, and then the inkjet ink 24 (having the colorant) may be printed over the active agent 26 on subsequent print passes.

In an example of the printing method 100, the printed image 37 is formed without post-treatment processing. The printed image 37 without the post-treatment is of a desirable color quality and is durable (e.g., washfast/water resistant).

In an example of the printing method 100, the inkjet ink is a dye sublimation inkjet ink, and the method further comprises maintaining the dye sublimation inkjet ink 24 separate from the active agent 26 until they are inkjet printed.

In some examples, the source 36 of radiation 44 may be positioned to apply radiation 44 to the textile substrate 33 immediately after the ink 24/active agent 26 has been applied thereto. In the example shown in FIG. 2, the source 36 of radiation 44 is disposed in the sublimation zone 38, which allows for printing and exposing to radiation 44 in a single pass. In this example, the source 36 may be moved or scanned across the printed image 37 in the sublimation zone 38.

In another example, a source 28 of radiation 44 may be in a fixed position with respect to the textile substrate 33. The source 28 in the fixed position may be a conductive heater or a radiative heater that is part of the printing system 30. These types of heaters (sources 28 of radiation 44) may be placed below the textile substrate 33 (e.g., conductive heating from below the substrate 33, such as with, e.g., a conductive platen (source 28 is shown schematically as a platen in FIG. 2) upon which the textile substrate/fabric 33 is transported). These types of heaters (sources 28 of radiation 44) may also or alternatively be placed above the textile substrate 33 (e.g., radiative heating/warming of the textile substrate 33). In another example, the source 28 of radiation 44 may not be in a fixed position (e.g., similar to source 36) with respect to the textile substrate 33; for example, the textile substrate/fabric 33 may move through a warming zone that is heated by the source 28 of radiation 44.

The source 36, 28 of radiation 44 may emit radiation 44 having wavelengths ranging from about 700 nm to about 1 mm. As such, in an example, the electromagnetic radiation to which the textile fabric is exposed has a wavelength ranging from about 700 nm to about 1 mm. In another example, the radiation 44 may range from about 800 nm to about 2 μm. As yet another example, the radiation 44 may be blackbody radiation with a maximum intensity at a wavelength of about 1100 nm. The source 36, 28 of radiation 44 may be infrared (IR) or near-infrared (NIR, near-IR) light sources, such as IR or near-IR curing lamps, IR or near-IR light emitting diodes (LED), lasers with the desirable IR or near-IR electromagnetic wavelengths, or any combination thereof.

The source 36, 28 of radiation 44 may be operatively connected to a lamp/laser driver, an input/output temperature controller, and temperature sensors, which are collectively shown as radiation system components 36', 28'. The respective radiation system components 36', 28' may operate together (i.e., lamp/laser driver, input/output temperature controller, and temperature sensors) to control the respective source 36, 28 of radiation 44. The temperature recipe (e.g., radiation exposure rate) may be submitted to the input/output temperature controller. During heating, the temperature sensors may sense the temperature of the textile fabric 33, and the temperature measurements may be transmitted to the input/output temperature controller. For example, a thermometer associated with the heated area can provide temperature feedback. The input/output temperature controller may adjust the source 36, 28 of radiation 44 power set points based on any difference between the recipe and the real-time measurements. These power set points are sent to the lamp/laser drivers, which transmit appropriate lamp/laser voltages to the source 36, 28 of radiation 44. It is to be understood that this is one example of the radiation system components 36', 28', and that other radiation source control systems may be used. For example, a print system 30 controller (not shown) may be configured to control the source 36, 28 of radiation 44.

In an example of the printing method 100, the inkjet ink is a dye sublimation inkjet ink, and the method further comprises warming the textile fabric 33 having the ink 24 and active agent 26 thereon at a temperature below a sublimation temperature of the dye sublimation inkjet ink 24: i) before the exposing (to electromagnetic radiation); or ii) concurrently with the exposing; or iii) both before and concurrently with the exposing. It is to be understood that the warming may be accomplished by either or both of the sources 36, 28 of radiation 44.

In an example of the printing method 100, the temperature at which the textile fabric 33 is warmed ranges from about 110° C. to about 150° C. In another example, the temperature at which the textile fabric 33 is warmed ranges from about 90° C. to about 170° C. It is to be understood that this warming temperature range may vary, depending upon, e.g., the sublimation temperature of the selected dye sublimation inkjet ink. For example, if the sublimation temperature of a selected ink were 200° C., the warming temperature may be any suitable temperature below 200° C.

In an example of the printing method 100, the warming takes place for an amount of time ranging from about 0.1 seconds to about 30 seconds. In another example, the warming takes place for an amount of time ranging from about 1 second to about 5 seconds. In yet another example, the warming takes place for an amount of time ranging from about 3 seconds to about 8 seconds. It is to be understood that this warming time range may vary, depending upon, e.g., the temperature at which warming takes place. For example, if the warming temperature is at a higher end of a range, the time for warming may be at a lower end of a range. It is to be further understood that examples of the method 100 may be accomplished without warming/preheating. For example, if the amount of time and the temperature at which the fabric 33 having the ink 24 and active agent 26 thereon is exposed to radiation is enough to sublimate the ink 24 into the fabric 33, warming may not be performed.

In still another example of the printing method 100, the inkjet ink is a dye sublimation inkjet ink, the active agent 26 is applied directly onto the textile fabric 33 before the dye sublimation inkjet ink 24 is applied, and the method 100 further comprises warming the textile fabric 33 having the active agent 26 thereon at a temperature below a sublimation temperature of the dye sublimation inkjet ink 24: i) before the dye sublimation inkjet ink 24 is applied; and ii) before the exposing. In these examples, the active agent 26 may be applied directly onto the textile fabric 33, and then the textile fabric 33 having the active agent 26 thereon may be warmed to a temperature below a sublimation temperature of the dye sublimation inkjet ink 24, and then the dye sublimation inkjet ink 24 may be applied, and then the exposure to sublimate the inkjet ink 24 may be performed. This example may help to improve edge and/or character definition and may also avoid or minimize image blurring.

In an example of the printing method 100, the inkjet ink is a dye sublimation inkjet ink, and the exposing (to electromagnetic radiation) takes place for an amount of time sufficient to raise a temperature of the textile fabric 33 having the dye sublimation inkjet ink 24 and the active agent 26 thereon to a temperature at which the inkjet ink is sublimated. This temperature will depend, in part, upon the textile fabric 33 and the inkjet ink 24 selected. As an example, the exposing (to electromagnetic radiation) takes place for an amount of time sufficient to raise a temperature of the textile fabric 33 having the dye sublimation inkjet ink 24 and the active agent 26 thereon to between about 150° C. and about 210° C. In another example, the exposing takes place for an amount of time sufficient to raise a temperature of the textile fabric 33 having the dye sublimation inkjet ink 24 and the active agent 26 thereon to between about 180° C. and about 220° C. In yet another example, the exposing takes place for an amount of time sufficient to raise a temperature of the textile fabric 33 having the dye sublimation inkjet ink 24 and the active agent 26 thereon to between about 182° C. and about 215° C. It is to be understood that this temperature range (i.e., the temperature range within which the dye 24 will sublimate into the fabric 33) for the textile fabric 33 may vary, depending upon, e.g., the sublimation temperature of the selected dye sublimation inkjet ink. For example, if the sublimation temperature of a selected ink were 200° C., the temperature to which the fabric is raised may be any suitable temperature at or slightly above (e.g., +5° C.) 200° C.

In an example of the printing method 100, the exposing (of the textile fabric 33 having the dye sublimation inkjet ink 24 and the active agent 26 thereon to electromagnetic radiation) is accomplished at an amount of time ranging from about 1 second to about 15 seconds. In another example, the exposing is accomplished at an amount of time ranging from about 2 seconds to about 20 seconds. It is to be understood that the time for exposing to radiation may be the time of a single exposure event, or it may be the cumulative time of multiple short exposing events. It is to be further understood that if multiple short exposing events are used, each of the short exposing events would be accomplished at, or slightly above (e.g., +5° C.) the sublimation temperature of the selected dye sublimation inkjet ink.

In an example of the method 100, the inkjet ink is a dye sublimation inkjet ink, and an amount of the active agent 26 printed onto the textile fabric 33 ranges from about 1% to about 60%, relative to a total volume of the dye sublimation inkjet ink 24 printed onto the textile fabric 33. In another example, an amount of the active agent 26 printed onto the textile fabric 33 ranges from about 10% to about 20%, relative to a total volume of the dye sublimation inkjet ink 24 printed onto the textile fabric 33. In yet another example, an amount of the active agent 26 printed onto the textile fabric 33 ranges from about 5% to about 45%; or from about 10% to about 30%; or from about 10% to about 50%, relative to a total volume of the dye sublimation inkjet ink 24 printed onto the textile fabric 33. It is to be understood that by "relative to a total volume of the dye sublimation inkjet ink" is meant that, for example, if the desired active agent 26 volume were 10%, and the total volume of the inkjet ink 24 were 100 picoliters, the amount of active agent 26 printed on the fabric 33 would be 10 picoliters (along with the 100 picoliters of inkjet ink 24). Further, it is to be understood that the amount of active agent 26 to be printed on the textile fabric 33 depends upon how much colorant/ink 24 is to be sublimated and for how long the exposure (to radiation) takes place. For example, if the exposing takes place for a longer amount of time, less active agent 26 may be applied; or if the exposing takes place for a shorter amount of time, more active agent 26 may be applied. In another example, if a smaller amount of colorant is to be sublimated, less active agent 26 may be applied; or if a larger amount of colorant is to be sublimated, more active agent 26 may be applied. Further, it is to be understood that the amount of active agent 26 to be printed may also depend upon if a warming event (as described above) is included, and if so, for how long and at what warming temperature.

Active Agents

In the examples of the method 100 and the system 30 disclosed herein, and as mentioned above, an active agent 26 may be used. Some examples of the active agent 26 are dispersions including a radiation absorber (i.e., an active material). In an example, the electromagnetic radiation-absorbing active material is selected from the group consisting of an infrared light absorber, a near-infrared light absorber, a plasmonic resonance absorber, and combinations thereof.

In an example, the electromagnetic radiation-absorbing active material comprises the plasmonic resonance absorber. In an example, the plasmonic resonance absorber comprises an inorganic pigment selected from the group consisting of lanthanum hexaboride, tungsten bronzes, indium tin oxide, antimony tin oxide, titanium nitride, aluminum zinc oxide, ruthenium oxide, silver, gold, platinum, iron pyroxenes, modified iron phosphates, modified copper phosphates, modified copper pyrophosphates, and combinations thereof.

In some examples, the active material may be any infrared light absorbing colorant. In an example, the active material is a near-infrared light absorber. Any near-infrared colorants, e.g., those produced by Fabricolor, Eastman Kodak, BASF, or Yamamoto, may be used in the active agent 26.

Other suitable active materials include near-infrared absorbing dyes or plasmonic resonance absorbers.

Some suitable examples of active agent 26 include Lumogen® IR 765 and Lumogen® IR 788, commercially available from BASF. The Lumogen® dyes are quaterrylene dyes, which are based on the following chemical backbone:

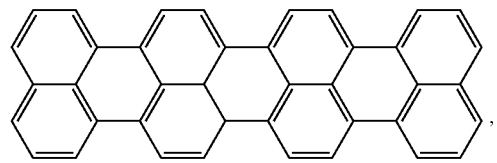 [SMILES: C1=CC2c3ccc4c5cccc6cccc(c7ccc(c3c74)C3=CC=c4c(c1c1cccc7cccc4c71)C32)c65]

which may have pendant groups attached on the ends, and in some instances along the backbone chain.

As another example, the active agent 26 may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

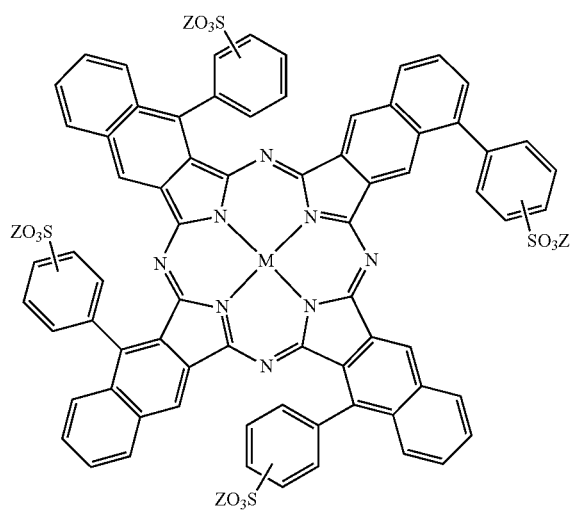

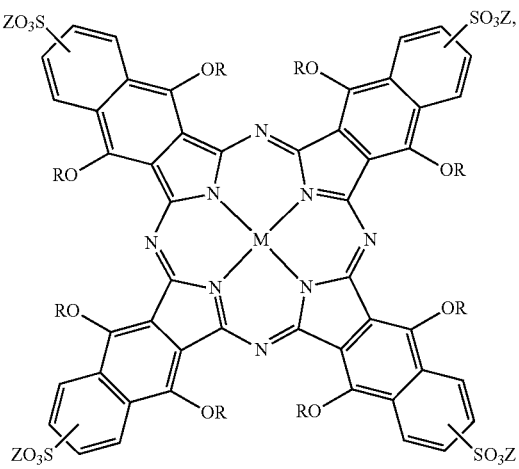

-continued

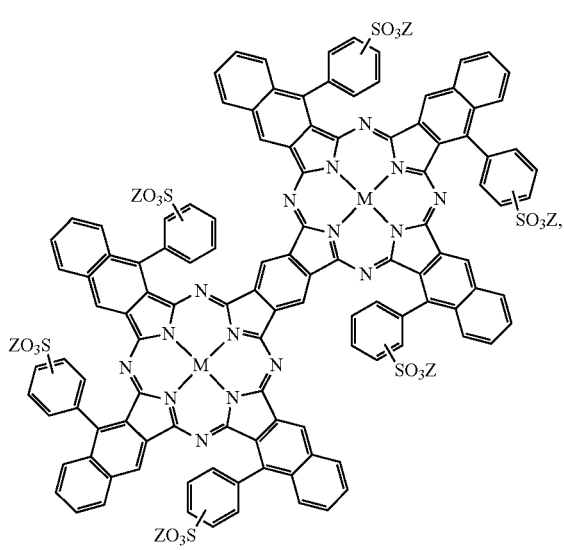

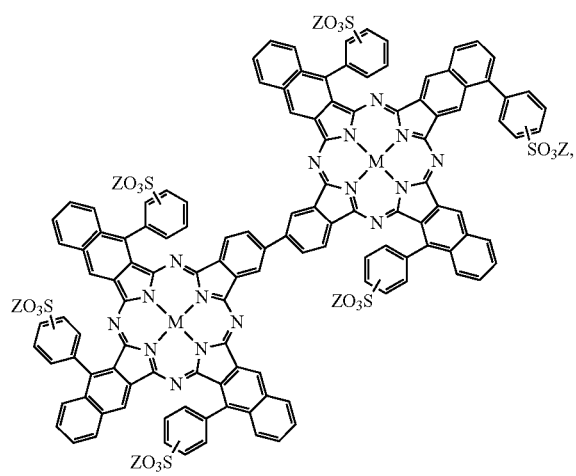

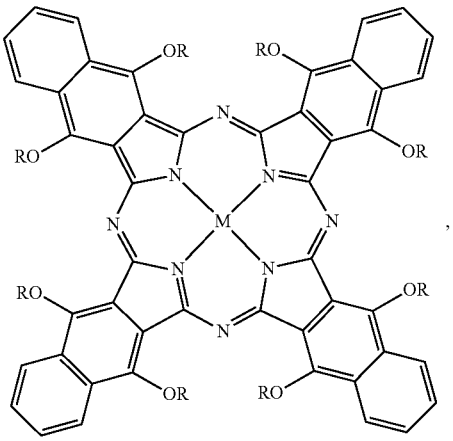

and mixtures thereof. In the above formulations, M can be a divalent metal atom (e.g., copper, etc.) or can have $OSO_3Na$ axial groups filling any unfilled valencies if the metal is more than divalent (e.g., indium, etc.), R can be hydrogen or any $C_1$-$C_8$ alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

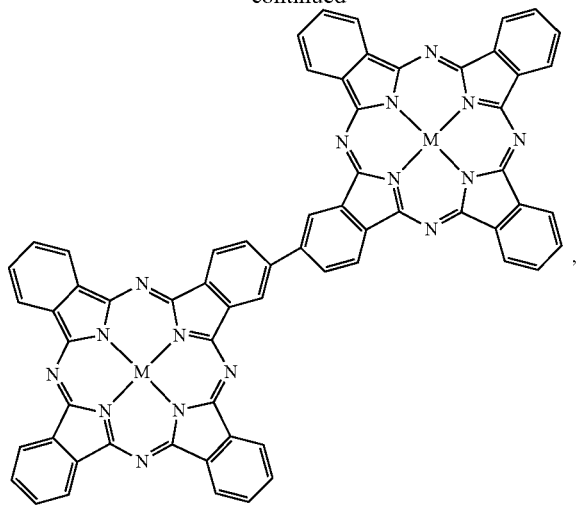

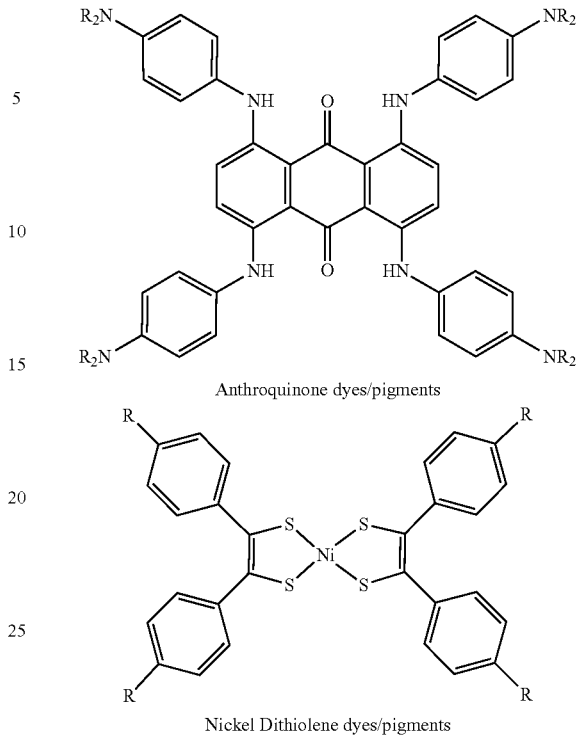

Anthroquinone dyes/pigments

Nickel Dithiolene dyes/pigments

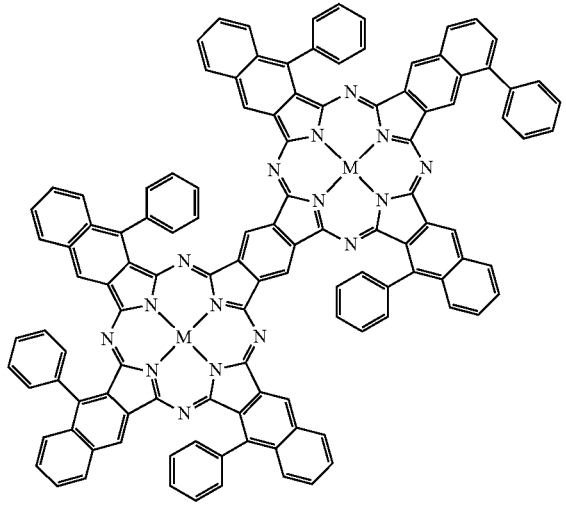

and mixtures thereof. For the hydrophobic near-infrared absorbing dyes, M can be a divalent metal atom (e.g., copper, etc.) or can include a metal that has Cl, Br, or OR' (R'=H, CH$_3$, COCH$_3$, COCH$_2$COOCH$_3$, COCH$_2$COCH$_3$) axial groups filling any unfilled valencies if the metal is more than divalent, and R can be hydrogen or any C$_1$-C$_8$ alkyl group (including substituted alkyl and unsubstituted alkyl).

Other near-infrared absorbing dyes or pigments may be used. Some examples include anthroquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthroquinone dyes or pigments and metal (e.g., nickel) dithiolene dyes or pigments may have the following structures, respectively:

where R in the anthroquinone dyes or pigments may be hydrogen or any C$_1$-C$_8$ alkyl group (including substituted alkyl and unsubstituted alkyl), and R in the dithiolene may be hydrogen, COOH, SO$_3$, NH$_2$, any C$_1$-C$_8$ alkyl group (including substituted alkyl and unsubstituted alkyl), or the like.

Cyanine dyes or pigments and perylenediimide dyes or pigments may have the following structures, respectively:

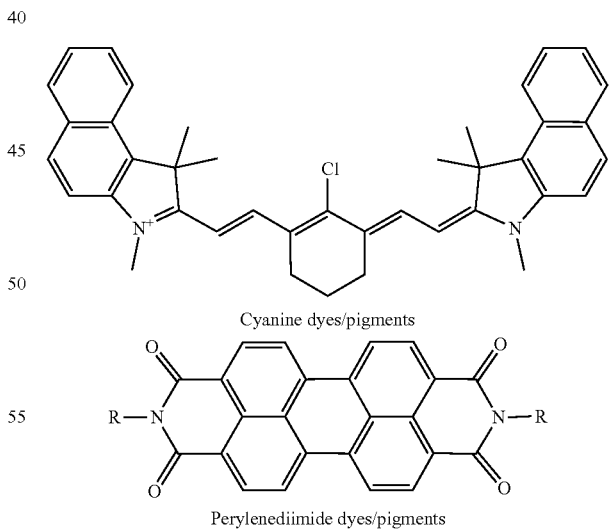

Cyanine dyes/pigments

Perylenediimide dyes/pigments where R in the perylenediimide dyes or pigments may be hydrogen or any C$_1$-C$_8$ alkyl group (including substituted alkyl and unsubstituted alkyl).

Croconium dyes or pigments and pyrilium or thiopyrilium dyes or pigments may have the following structures, respectively:

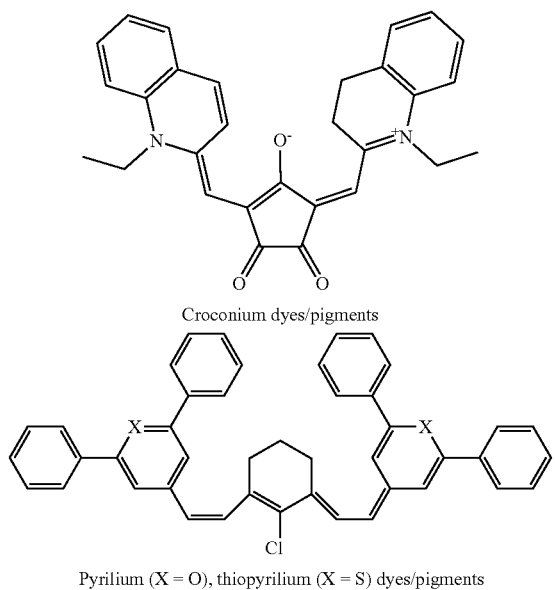

Croconium dyes/pigments

Pyrilium (X = O), thiopyrilium (X = S) dyes/pigments

Boron-dipyrromethene dyes or pigments and aza-boron-dipyrromethene dyes or pigments may have the following structures, respectively:

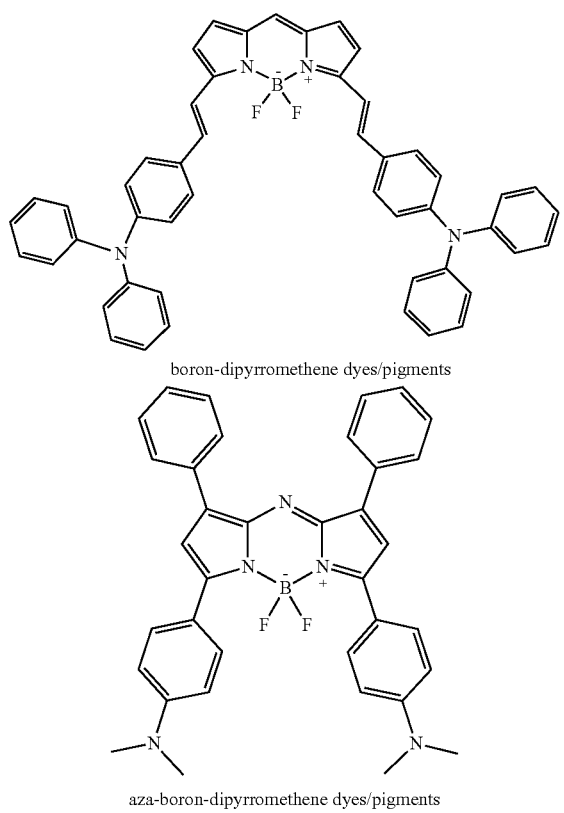

boron-dipyrromethene dyes/pigments aza-boron-dipyrromethene dyes/pigments

In other examples, the active material may be a plasmonic resonance absorber. The plasmonic resonance absorber allows the active agent 26 to absorb radiation at wavelengths ranging from 800 nm to 4000 nm (e.g., at least 80% of radiation having wavelengths ranging from 800 nm to 4000 nm is absorbed), which enables the active agent 26 to convert enough radiation to thermal energy so that the dye sublimation inkjet ink 24 sublimes into the textile fabric 33. The plasmonic resonance absorber also allows the active agent 26 to have transparency at wavelengths ranging from 400 nm to 780 nm (e.g., 20% or less of radiation having wavelengths ranging from 400 nm to 780 nm is absorbed), which enables the printed article 40 to be lightly colored without the active agent 26 deleteriously affecting the color of the printed article 40.

The absorption of the plasmonic resonance absorber is the result of the plasmonic resonance effects. Electrons associated with the atoms of the plasmonic resonance absorber may be collectively excited by radiation, which results in collective oscillation of the electrons. The wavelengths that can excite and oscillate these electrons collectively are dependent on the number of electrons present in the plasmonic resonance absorber particles, which in turn is dependent on the size of the plasmonic resonance absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the active agent 26 to be inkjet jettable as well as electromagnetically selective (e.g., having absorption at wavelengths ranging from 800 nm to 4000 nm and transparency at wavelengths ranging from 400 nm to 780 nm).

In an example, the plasmonic resonance absorber has an average particle diameter (e.g., volume-weighted mean diameter) ranging from greater than 0 nm to less than 220 nm. In another example the plasmonic resonance absorber has an average particle diameter ranging from greater than 0 nm to 120 nm. In a still another example, the plasmonic resonance absorber has an average particle diameter ranging from about 10 nm to about 200 nm.

In an example, the plasmonic resonance absorber is an inorganic pigment. Examples of suitable inorganic pigments include lanthanum hexaboride ($LaB_6$), tungsten bronzes ($A_xWO_3$), indium tin oxide ($In_2O_3:SnO_2$, ITO), antimony tin oxide ($Sb_2O_3:SnO_2$, ATO), titanium nitride (TiN), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_z$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

Example Active Agents a. Dispersion

Examples of the active agents 26 include a dispersion comprising a metal oxide nanoparticle having the formula (1) $M_mM'O_n$ wherein M is an alkali metal, m is greater than 0 and less than 1, M' is any metal, and n is greater than 0 and less than or equal to 4; a zwitterionic stabilizer; and a balance of water.

As used in this example, the term "dispersion" refers to a two-phase system where one phase consists of finely divided metal oxide particle distributed throughout a bulk substance, i.e., a liquid active agent vehicle. The metal oxide nanoparticle is the dispersed or internal phase, and the bulk substance is the continuous or external phase (liquid vehicle). As disclosed in this example, the liquid medium is an aqueous liquid medium, i.e., comprising water.

In some examples, the metal oxide nanoparticles may be present in the dispersion in an amount ranging from about 1 wt % to about 20 wt % based on the total weight of the dispersion. In some other example, the zwitterionic stabilizer may be present in the dispersion in an amount ranging from about 2 wt % to about 35 wt % (based on the total weight of the dispersion). In yet some other examples, the weight ratio of the metal oxide nanoparticles to the zwitterionic stabilizer ranges from 1:10 to 10:1. In another example, the weight ratio of the metal oxide nanoparticles to the zwitterionic stabilizer is 1:1.

b. Nanoparticles

In some examples, described herein is a nanoparticle metal oxide having formula (1): $M_mM'O_n$ wherein M is an alkali metal, m is greater than 0 and less than 1, M' is any metal, and n is greater than 0 and less than or equal to 4.

As per formula (1), M is an alkali metal, and can be lithium (Li), sodium (Na), potassium (K), rubidium (Rb), cesium (Cs), or mixtures thereof. Indeed, without being bound by any theory, it is believed that such compound possesses a satisfactory absorption of NIR light (having a wavelength between about 750 nm and about 1400 nm) while retaining a high transmittance of visible light (having a wavelength between about 380 nm to about 750 nm).

In some examples, the nanoparticles of the present example absorb infrared light in a range of from about 750 nm to about 2300 nm. In some other examples, the nanoparticles of the present example absorb infrared light in a range of from about 780 nm to about 1400 nm. In yet some other examples, the nanoparticles of the present example absorb infrared light in a range of from about 780 nm to about 2300 nm. The metal oxide nanoparticles can also absorb infrared light in a range of from about 780 nm to about 2300 nm, or from about 790 nm to about 1800 nm, or from about 800 nm to about 1500 nm, or from about 810 nm to about 1200 nm, or from about 820 nm to about 1100 nm, or from about 830 nm to about 1000 nm. The metal oxide can be an IR absorbing inorganic nanoparticle.

The metal oxide nanoparticles of the present example have the formula (1) $M_mM'O_n$. In the formula (1), M is an alkali metal. In some examples, M is lithium (Li), sodium (Na), potassium (K), rubidium (Rb), cesium (Cs), or mixtures thereof. In some other examples, M is cesium (Cs). In the formula (1), M' is any metal. In some examples, M' is tungsten (W), molybdenum (Mb), tantalum (Ta), hafnium (Hf), cerium (Ce), lanthanum (La), or mixtures thereof. In some other examples, M' is tungsten (W). In the formula (1), m is greater than 0 and less than 1. In some examples, m can be 0.33. In the formula (1), n is greater than 0 and less than or equal to 4. In some examples, n can be greater than 0 and less than or equal to 3. In some examples, the nanoparticles of the present disclosure have the formula (1) $M_mM'O_n$, wherein M' is tungsten (W), n is 3 and M is lithium (Li), sodium (Na), potassium (K), rubidium (Rb), cesium (Cs), or mixtures thereof. The nanoparticles are thus Tungsten Bronze nanoparticles having the formula $M_mWO_3$.

In some other examples, the metal oxide nanoparticles are Cesium Tungsten nanoparticles having the formula (1) $M_mM'O_n$, wherein M is cesium (Cs), m is 0.33, M' is tungsten (W), and n is greater than 0 and less than or equal to 3. In an example, the metal oxide nanoparticle is a cesium tungsten oxide nanoparticles having a general formula of $Cs_xWO_3$, where $0<x<1$. The cesium tungsten oxide nanoparticles may give the dispersion a light blue color. The strength of the color may depend, at least in part, on the amount of the cesium tungsten oxide nanoparticles in the dispersion.

In some examples, the metal oxide particles can have a diameter of from about 0.01 nm to about 400 nm, or from about 0.1 nm to about 350 nm, or from about 0.5 nm to about 300 nm, or from about 0.7 nm to about 250 nm, or from about 0.8 nm to about 200 nm, or from about 0.9 nm to about 150 nm, or from about 1 nm to about 100 nm, or from about 1 nm to about 90 nm, or from about 1 nm to about 80 nm, or from about 1 nm to about 70 nm, or from about 1 nm to about 60 nm, or from about 2 nm to about 50 nm, or from about 3 nm to about 40 nm, or from about 3 nm to about 30 nm, or from about 3 to about 20 nm, or from about 3 to about 10 nm. In a more specific example, the average particle size (e.g., volume-weighted mean diameter (MV)) of the metal oxide nanoparticles may range from about 1 nm to about 40 nm. In some examples, the average particle size of the metal oxide nanoparticles may range from about 1 nm to about 15 nm or from about 1 nm to about 10 nm. The upper end of the particle size range (e.g., from about 30 nm to about 40 nm) may be less desirable, as these particles may be more difficult to stabilize.

c. Zwitterionic Stabilizer

The dispersion of the present example, comprising metal oxide nanoparticles, also includes the zwitterionic stabilizer. The zwitterionic stabilizer may improve the stabilization of the dispersion. The zwitterionic stabilizer may enhance the stability of the cesium tungsten oxide nanoparticle dispersion during shipment and storage. While the zwitterionic stabilizer has an overall neutral charge, at least one area of the molecule has a positive charge (e.g., amino groups) and at least one other area of the molecule has a negative charge. The metal oxide nanoparticles may have a slight negative charge. The zwitterionic stabilizer molecules may orient around the slightly negative metal oxide nanoparticles with the positive area of the zwitterionic stabilizer molecules closest to the metal oxide nanoparticles and the negative area of the zwitterionic stabilizer molecules furthest away from the metal oxide nanoparticles. Then, the negative charge of the negative area of the zwitterionic stabilizer molecules may repel metal oxide nanoparticles from each other. The zwitterionic stabilizer molecules may form a protective layer around the metal oxide nanoparticles, and prevent them from coming into direct contact with each other and/or increase the distance between the particle surfaces (e.g., by a distance ranging from about 1 nm to about 2 nm). Thus, the zwitterionic stabilizer may prevent the metal oxide nanoparticles from agglomerating and/or settling in the dispersion.

Examples of suitable zwitterionic stabilizers include $C_2$ to $C_8$ betaines, $C_2$ to $C_8$ amino-carboxylic acids having a solubility of at least 10 g in 100 g of water, taurine, and combinations thereof. Examples of the $C_2$ to $C_8$ amino-carboxylic acids include beta-alanine, gamma-aminobutyric acid, glycine, and combinations thereof.

The zwitterionic stabilizer may be present in the dispersion in an amount ranging from about 2 wt % to about 35 wt % (based on the total weight of the dispersion). When the zwitterionic stabilizer is the $C_2$ to $C_8$ betaine, the $C_2$ to $C_8$ betaine may be present in an amount ranging from about 8 wt % to about 35 wt % of a total weight of the dispersion. When the zwitterionic stabilizer is the $C_2$ to $C_8$ amino-carboxylic acid, the $C_2$ to $C_8$ amino-carboxylic acid may be present in an amount ranging from about 2 wt % to about 20 wt % of a total weight of the dispersion. When the zwitterionic stabilizer is taurine, taurine may be present in an amount ranging from about 2 wt % to about 35 wt % of a total weight of the dispersion. The zwitterionic stabilizer may be added to the metal oxide nanoparticles and water before, during, or after milling of the nanoparticles in the water to form the dispersion.

Active Material Loading and Active Agent Vehicle

The amount of the active material that is present in the active agent 26 ranges from greater than 0 wt % to about 40 wt % based on the total weight of the active agent 26. In other examples, the amount of the active material in the active agent 26 ranges from about 0.3 wt % to 30 wt %, from about 1 wt % to about 20 wt %, from about 1.0 wt % up to about 10.0 wt %, or from greater than 4.0 wt % up to about 15.0 wt %. It is believed that these active material loadings provide a balance between the active agent 26 having jetting reliability and heat and/or radiation absorbance efficiency.

As used herein, "AA vehicle" (active agent vehicle) may refer to the liquid in which the active material is dispersed or dissolved to form the active agent 26. A wide variety of AA vehicles, including aqueous and non-aqueous vehicles, may be used in the active agent 26. In some examples, the AA vehicle may include water alone or a non-aqueous solvent alone with no other components. In other examples, the AA vehicle may include other components, depending, in part, upon the inkjet printhead that is to be used to dispense the active agent 26. Examples of other suitable active agent components include dispersant(s), silane coupling agent(s), co-solvent(s), surfactant(s), antimicrobial agent(s), anti-kogation agent(s), and/or chelating agent(s).

When the active material is the plasmonic resonance absorber, the plasmonic resonance absorber may, in some instances, be dispersed with a dispersant. As such, the dispersant helps to uniformly distribute the plasmonic resonance absorber throughout the active agent 26. Examples of suitable dispersants include polymer or small molecule dispersants, charged groups attached to the plasmonic resonance absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the active agent 26 may range from about 10 wt % to about 200 wt % based on the weight of the plasmonic resonance absorber in the active agent 26.

When the active material is the plasmonic resonance absorber, a silane coupling agent may also be added to the active agent 26 to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the active agent 26 may range from about 0.1 wt % to about 50 wt % based on the weight of the plasmonic resonance absorber in the active agent 26. In an example, the total amount of silane coupling agent(s) in the active agent 26 ranges from about 1 wt % to about 30 wt % based on the weight of the plasmonic resonance absorber. In another example, the total amount of silane coupling agent(s) in the active agent 26 ranges from about 2.5 wt % to about 25 wt % based on the weight of the plasmonic resonance absorber.

The solvent of the active agent 26 may be water or a non-aqueous solvent (e.g., ethanol, acetone, n-methyl pyrrolidone, aliphatic hydrocarbons, etc.). In some examples, the active agent 26 consists of the active material and the solvent (without other components). In these examples, the solvent makes up the balance of the active agent 26.

Classes of organic co-solvents that may be used in a water-based active agent 26 include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Other examples of suitable co-solvents include water-soluble high-boiling point solvents, which have a boiling point of at least 120° C., or higher. Some examples of high-boiling point solvents include 2-pyrrolidone (also known as 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) may be present in the active agent 26 in a total amount ranging from about 1 wt % to about 50 wt % based upon the total weight of the active agent 26, depending upon the jetting architecture of the inkjet printhead. In an example, the total amount of the co-solvent(s) present in the active agent 26 is 25 wt % based on the total weight of the active agent 26.

The co-solvent(s) of the active agent 26 may depend, in part, upon the jetting technology that is to be used to dispense the active agent 26. For example, if thermal inkjet printheads are to be used, water and/or ethanol and/or other longer chain alcohols (e.g., pentanol) may be the solvent (i.e., makes up 35 wt % or more of the active agent 26) or co-solvents. For another example, if piezoelectric inkjet printheads are to be used, water may make up from about 25 wt % to about 30 wt % of the active agent 26, and the solvent (i.e., 35 wt % or more of the active agent 26) may be ethanol, isopropanol, acetone, etc. The co-solvent(s) of the active agent 26 may also depend, in part, upon the textile fabric/ substrate 33 that is being used with the active agent 26. For a hydrophobic substrate 33 (e.g., a polyamide), the AA vehicle may include a higher solvent content in order to improve the flow of the active agent 26 into the fabric 33.

The AA vehicle may also include humectant(s). In an example, the total amount of the humectant(s) present in the active agent 26 ranges from about 3 wt % to about 10 wt %, based on the total weight of the active agent 26. An example of a suitable humectant is LIPONIC® EG-1 (also known as LEG-1, glycereth-26, and ethoxylated glycerol, available from Lipo Chemicals).

In some examples, the AA vehicle includes surfactant(s) to improve the jettability of the active agent 26. Examples of suitable surfactants include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants, such as CAPSTONE® FS-35, from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (polyether siloxane) available from Evonik). In some examples, it may be desirable to utilize a surfactant having a hydrophilic-lipophilic balance (HLB) less than 10.

Whether a single surfactant is used or a combination of surfactants is used, the total amount of surfactant(s) in the active agent 26 may range from about 0.01 wt % to about 10 wt % based on the total weight of the active agent 26. In an example, the total amount of surfactant(s) in the active agent 26 may be about 3 wt % based on the total weight of the active agent 26.

An anti-kogation agent may be included in the active agent 26 that is to be jetted when using thermal inkjet printing. Kogation refers to the deposit of dried printing liquid (e.g., active agent 26) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the active agent 26 may range from greater than 0.20 wt % to about 0.65 wt % based on the total weight of the active agent 26. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

The AA vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the active agent 26 may include a total amount of antimicrobial agents that ranges from about 0.05 wt % to about 1 wt %. In an example, the antimicrobial agent(s) is/are a biocide(s) and is/are present in the active agent 26 in an amount of about 0.25 wt % (based on the total weight of the active agent 26).

Chelating agents (or sequestering agents) may be included in the AA vehicle to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the active agent 26 may range from greater than 0 wt % to about 2 wt % based on the total weight of the active agent 26. In an example, the chelating agent(s) is/are present in the active agent 26 in an amount of about 0.04 wt % (based on the total weight of the active agent 26).

Textile Fabrics

In an example of printing method 100 (and for use in the system 30), the textile fabric 33 is selected from the group consisting of polyester fabrics and polyester blend fabrics. It is to be understood that the polyester fabrics may be a polyester coated surface. The polyester blend fabrics may be blends of polyester and other materials (e.g., cotton, linen, nylons, etc., as long as polyester is present in an amount of at least 50 wt % and is present at or near the surface of the fabric). In one example, the polyester blend includes from about 70 wt % to about 80 wt % of the polyester. In another example, the textile fabric 33 may be selected from nylons (polyamides) or other synthetic fabrics.

It is to be understood that the terms "textile fabric" or "fabric substrate" do not include materials commonly known as any kind of paper (even though paper can include multiple types of natural and synthetic fibers or mixtures of both types of fibers). Fabric substrates can include textiles in filament form, textiles in the form of fabric material, or textiles in the form of fabric that has been crafted into finished articles (e.g., clothing, blankets, tablecloths, napkins, towels, bedding material, curtains, carpet, handbags, shoes, banners, signs, flags, etc.). In some examples, the fabric substrate can have a woven, knitted, non-woven, or tufted fabric structure. In one example, the fabric substrate can be a woven fabric where warp yarns and weft yarns can be mutually positioned at an angle of about 90°. This woven fabric can include fabric with a plain weave structure, fabric with twill weave structure where the twill weave produces diagonal lines on a face of the fabric, or a satin weave. In another example, the fabric substrate can be a knitted fabric with a loop structure. The loop structure can be a warp-knit fabric, a weft-knit fabric, or a combination thereof. A warp-knit fabric refers to every loop in a fabric structure that can be formed from a separate yarn mainly introduced in a longitudinal fabric direction. A weft-knit fabric refers to loops of one row of fabric that can be formed from the same yarn. In a further example, the fabric substrate can be a non-woven fabric. For example, the non-woven fabric can be a flexible fabric that can include a plurality of fibers or filaments that are one or both bonded together and interlocked together by a chemical treatment process (e.g., a solvent treatment), a mechanical treatment process (e.g., embossing), a thermal treatment process, or a combination of multiple processes.

Dye Sublimation Inkjet Inks

An example of a thermal inkjet dye sublimation ink suitable for use in examples of the present method consists of or comprises a disperse dye colorant dispersion present in an amount ranging from about 1 wt % actives to about 7 wt % actives based on a total weight of the ink; a co-solvent system present in a total amount ranging from about 12 wt % to about 25 wt % based on the total weight of the ink, the co-solvent system consisting of glycerol present in an amount ranging from about 9 wt % to about 16 wt % based on the total weight of the ink, ethoxylated glycerol present in an amount ranging from 0 wt % to about 5 wt % based on the total weight of the ink, and a water soluble or water miscible organic solvent present in an amount ranging from 0 wt % to about 7 wt % based on the total weight of the ink; an additive selected from the group consisting of a surfactant, a chelating agent, a buffer, a biocide, and combinations thereof; and a balance of water. In some examples, the thermal inkjet dye sublimation ink consists of the listed components and no additional components (such as shear thinning agents, additional solvents, etc.). In other examples, the thermal inkjet dye sublimation ink comprises the listed components, and other components that do not deleteriously affect the jettability of the ink via a thermal inkjet printhead may be added. In still other examples, the thermal inkjet dye sublimation ink disclosed herein does not include a capsule having a core-shell structure, where the core contains a thermally curable compound and the shell contains a polymer. These types of core-shell structures can form a polymeric resin or crosslinked network when thermally activated, and are not included in the examples disclosed herein.

Another example of a thermal inkjet dye sublimation ink suitable for use in examples of the present method consists of or comprises a disperse dye colorant dispersion present in an amount ranging from about 1 wt % actives to about 7 wt % actives based on a total weight of the ink; a primary solvent selected from the group consisting of glycerol, ethoxylated glycerol, 2-methyl-1,3-propanediol, dipropylene glycol, and combinations thereof, the primary solvent being present in an amount ranging from about 10 wt % to about 22 wt % based on the total weight of the ink; a secondary solvent present in an amount ranging from 0 wt % to about 7 wt % based on the total weight of the ink; a chelating agent present in an amount ranging from 0 wt % actives to less than 0.1 wt % actives based on the total weight of the ink; oleth-3-phosphate present in an amount ranging from about 0.1 wt % to about 0.75 wt % based on the total weight of the ink; an additive selected from the group consisting of a buffer, a biocide, another surfactant, and combinations thereof; and a balance of water. In some examples, the thermal inkjet dye sublimation ink consists of the listed components and no additional components (such as shear thinning agents, additional solvents, etc.). In other examples, the thermal inkjet dye sublimation ink comprises the listed components, and other components that do not deleteriously affect the jettability of the ink via a thermal inkjet printhead may be added. In an example, the disperse dye in the disperse dye colorant dispersion is more soluble in the secondary solvent than in the primary solvent, and thus makes up less than 50% of the total solvent content (i.e., primary solvent plus secondary solvent, and not including water) so that the disperse dyes remain dispersed in the ink vehicle. The secondary solvent may be added to the ink vehicle or may be included as part of the disperse dye colorant dispersion. The co-solvent(s) is present in the disperse dye colorant dispersion in relatively low amounts (1 wt % to about 5 wt % based on the total weight of the colorant dispersion), and thus a fraction of the co-solvent(s) is carried over to the ink disclosed herein depending, in part, upon the dispersion solids and the loading of the dispersion in the ink.

A weight percentage that is referred to as "wt % actives" refers to the loading of an active component of a dispersion or other formulation that is present in the thermal inkjet dye sublimation ink. For example, the wt % actives of the disperse dye colorant dispersion accounts for the loading (as a weight percent) of the active dye solids present in the ink, and does not account for the weight of the other components (e.g., co-solvent, water, etc.) of the disperse dye colorant dispersion in the inkjet ink. The term "wt %," without the term actives, refers to the loading of a 100% active component that does not include other non-active components therein.

In the examples of the dye sublimation ink, the disperse dye colorant dispersion may be any color. In an example, the disperse dye colorant dispersion is selected from the group consisting of a black disperse dye colorant dispersion, a cyan disperse dye colorant dispersion, a magenta disperse dye colorant dispersion, and a yellow disperse dye colorant dispersion. Each disperse dye colorant dispersion includes a disperse dye, a dispersant, and a dispersion vehicle.

The disperse dye included in the colorant dispersion may depend on the desired color for the thermal inkjet dye sublimation ink.

Black disperse dye colorant dispersions often include a blend of disperse dyes, such as, for example, blends of blue, brown and yellow disperse dyes, or blends of blue, orange and violet disperse dyes, or blends of blue, orange and yellow disperse dyes, or blue, magenta, and yellow dyes. An example of a suitable blue, brown and yellow disperse dye blend include disperse blue 360 (DB360), disperse brown 27, and disperse yellow 54 (DY54). Some examples of suitable blue, orange and violet disperse dye blends include disperse blue 291:1 (DB291:1), disperse orange 29 (DO29) and disperse violet 63, or DB291:1, DO29 and disperse violet 99. An example of a suitable blue, orange and yellow dye blend includes DB360, disperse orange 25, and DY54. An example of a suitable blue, magenta, and yellow dye blend includes disperse blue 77 (DB77), disperse red 92, and disperse yellow 114 (DY 114).

Cyan disperse dye colorant dispersions may include blue disperse dyes, such as disperse blue 27, disperse blue 60, disperse blue 73, DB77, disperse blue 87, disperse blue 257, DB291:1, disperse blue 359, DB360, disperse blue 367, and mixtures thereof.

Magenta disperse dye colorant dispersions may include red disperse dyes, such as disperse red 60, disperse red 82, disperse red 86, disperse red 86:1, disperse red 167:1, disperse red 279, and mixtures thereof.

Yellow disperse dye colorant dispersions may include yellow disperse dyes, such as DY54, disperse yellow 64, disperse yellow 71, disperse yellow 86, DY114, disperse yellow 153, disperse yellow 233, disperse yellow 245, and mixtures thereof.

The disperse dye colorant dispersion may include from about 10 wt % dye solids to about 20 wt % dye solids based on the total weight of the colorant dispersion.

As mentioned above, each disperse dye colorant dispersion also includes a dispersant. The dispersant may be any suitable polymeric dispersant that can disperse the dye and that can be jetted via a thermal inkjet printhead.

Some examples of the polymeric dispersant (which may also be anionic or non-ionic) include polymers or copolymers of acrylics, methacrylics, acrylates, methacrylates, styrene, substituted styrene, α-methylstyrene, substituted α-methyl styrenes, vinyl naphthalenes, vinyl pyrollidones, maleic anhydride, vinyl ethers, vinyl alcohols, vinyl alkyls, vinyl esters, vinyl ester/ethylene copolymers, acrylamides, and/or methacrylamides. Some specific examples include a styrene methacrylic acid copolymer, a styrene acrylic acid copolymer, styrene acrylic acid-acrylic ester copolymers, styrene methacrylic acid-acrylic ester copolymers, a styrene maleic anhydride copolymer, polyacrylic acid partial alkyl ester, polyalkylene polyamine, polyacrylates, and vinyl naphthalene-maleic acid copolymers. Another example of a suitable polymeric dispersant is a polyurethane polymer. Still other examples of suitable polymeric dispersants for the disperse dye colorant dispersion include block acrylic copolymers, including A-B block copolymers such as benzyl methacrylate-methacrylic acid diblock copolymers and butyl methacrylate-methacrylic acid diblock copolymers. Still further examples of suitable polymeric dispersants include ABC triblock copolymers, such as benzyl methacrylate-methacrylic acid-ethoxytriethyleneglycol methacrylate triblock copolymers and butyl methacrylate-methacrylic acid-ethoxytriethyleneglycol methacrylate triblock copolymers. Still some other examples of suitable dispersants include low acid value acrylic resins, such as JONCRYL® 586, 671, 675, 678, 680, 683, 690, 693, and 695 (from BASF Corp.).

Examples of polymerization methods used to form the dispersant may include free radical processes, Group Transfer Processes (GTP), radical addition fragmentation (RAFT), atom transfer reaction (ATR), special chain transfer polymerization technology (SCT), and the like. As one example, the dispersant may be a graft acrylic copolymer made by SCT.

In other examples, the disperse dyes may be self-dispersing dyes. The disperse dyes may be exposed to a diazonium treatment (where a charged free radical from a degraded azo attaches to the colorant), or to an ozone treatment (oxidation and functionalization with, e.g., a carboxylic acid), or to a crosslinking treatment to render the dye self-dispersing.

The disperse dye colorant dispersion may include from about 4 wt % dispersant solids to about 7 wt % dispersant solids, based on the total weight of the colorant dispersion.

The mean particle size of the solids (e.g., the disperse dyes and the dispersants) in the disperse dye colorant dispersion may range from about 50 nm to about 100 nm. In another example, the mean particle size of the disperse dye ranges from about 100 nm to about 200 nm. These particle sizes are particularly suitable for being jetted through the orifices of thermal inkjet printheads.

The dispersion vehicle may include water and a water soluble or water miscible co-solvent. Examples of the water soluble or water miscible co-solvent/secondary solvent in the disperse dye colorant dispersion may include alcohols (e.g., diols, such as 1,2-propanediol, 1,3-propanediol, etc.), ketones, ketoalcohols, ethers (e.g., the cyclic ether tetrahydrofuran (THF), and others, such as thiodiglycol, sulfolane, 2-pyrrolidone, 1-(2-hydroxyethyl-2-pyrrolidone, 1,3-dimethyl-2-imidazolidinone and caprolactam; glycols such as ethylene glycol, diethylene glycol, tritriethylene glycol, tetraethylene glycol, propylene glycol, dipropylene glycol, tripropylene glycol, trimethylene glycol, butylene glycol, and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, and diethylene glycol monoethyl ether; and lower dialkyl ethers of polyhydric alcohols, such as diethylene glycol dimethyl or diethyl ether.

One or more of these co-solvents may be present in the disperse dye colorant dispersion in respective amounts ranging from about 1 wt % to about 5 wt %, based on the total weight of the colorant dispersion. The balance of the disperse dye colorant dispersion is water, such as purified water or deionized water.

In an example, the disperse dye colorant dispersion has i) a mean particle size ranging from about 50 nm to about 200 nm, and ii) from about 10 wt % dye solids to about 20 wt % dye solids and from about 4 wt % to about 7 wt % dispersant solids, based on the total weight of the colorant dispersion. In this example, the remainder of the disperse dye colorant dispersion may be co-solvent(s) and water.

It is to be understood that the specific co-solvent system and the low amount in which it is incorporated in the ink may aid in making the dye sublimation ink jettable via thermal inkjet printheads and also result in substantially consistent print quality over the life of the thermal inkjet printhead. As such, disclosed herein is a method for improving thermal inkjet printing performance of a dye sublimation ink, comprising: selecting a co-solvent system including glycerol and ethoxylated glycerol; and incorporating the selected co-solvent system into the dye sublimation ink, including: a disperse dye colorant dispersion present in an amount ranging from about 1 wt % actives to about 7 wt % actives based on a total weight of the ink; a water soluble or water miscible organic solvent present in an amount ranging from 0 wt % to about 7 wt % based on the total weight of the ink; an additive selected from the group consisting of a surfactant, a chelating agent, a buffer, a biocide, and combinations thereof; and water; and wherein the incorporating involves adding the glycerol in an amount ranging from about 9 wt % to about 16 wt % based on the total weight of the ink; and adding the ethoxylated glycerol in an amount ranging from 0 wt % to about 5 wt % based on a total weight of the ink.

To form the thermal inkjet dye sublimation ink disclosed herein, the disperse dye colorant dispersion is incorporated into an ink vehicle, which includes the co-solvent system of glycerol alone or in combination with ethoxylated glycerol, additive(s), and water.

The disperse dye colorant dispersion may be incorporated into the ink vehicle such that from about 1 wt % actives to about 7 wt % actives are present, based on a total weight of the thermal inkjet dye sublimation ink. In another example, the disperse dye colorant dispersion may be present in an amount ranging from about 3 wt % actives to about 5 wt % actives based on the total weight of the thermal inkjet dye sublimation ink. The wt % actives of the disperse dye colorant dispersion accounts for the loading (as a weight percent) of the active dye solids present in the ink, and does not account for the weight of the other components (e.g., co-solvent, water, etc.) of the disperse dye colorant dispersion in the inkjet ink.

The co-solvent system is present in a total amount ranging from about 12 wt % to about 25 wt % based on the total weight of the ink. The co-solvent system includes glycerol, and in some instances, ethoxylated glycerol.

Glycerol is the primary solvent, in part, because the disperse dye is highly non-soluble in glycerol. Glycerol is also selected, in part, because it also helps to maintain the nozzle health of the thermal inkjet printheads, and to provide substantially consistent print quality over the life of the printhead. The glycerol is present in an amount ranging from about 9 wt % to about 16 wt % based on the total weight of the ink.

Ethoxylated glycerol may also be present in the co-solvent system. In an example, the ethoxylated glycerol is present in an amount ranging from 0 wt % to about 5 wt %. The inclusion of ethoxylated glycerol may improve the turn-on energy curve for the ink, may help the thermal inkjet printhead fire better, and may improve decap performance. In some example inks, such as cyan inks, the print performance may be achieved without including the ethoxylated glycerol.

The co-solvent system may also include the water soluble or water miscible organic solvent present in an amount ranging from 0 wt % to about 7 wt % based on the total weight of the ink. In general, the disperse dye in the disperse dye colorant dispersion is more soluble in the water soluble or water miscible organic solvent than in the glycerol, and thus makes up less than 50% of the total solvent content (i.e., glycerol plus any ethoxylated glycerol plus the water soluble or water miscible organic solvent, and not including water) so that the disperse dyes remain dispersed in the ink vehicle. The water soluble or water miscible organic solvent may be added to the ink vehicle or may be included as the co-solvent from the disperse dye colorant dispersion. As such, in an example, at least a portion of the water soluble or water miscible organic solvent in the ink is also present in the disperse dye colorant dispersion (e.g., as the co-solvent of the dispersion). This co-solvent(s) is present in the disperse dye colorant dispersion in relatively low amounts (1 wt % to about 5 wt % based on the total weight of the colorant dispersion), and thus a fraction of the co-solvent(s) is carried over to the ink disclosed herein depending, in part, upon the dispersion solids and the loading of the dispersion in the ink. Examples of the water soluble or water miscible organic solvent/secondary solvent that may be present in the co-solvent system are selected from the group consisting of 2-pyrrolidone, propylene glycol, dipropylene glycol, 1,2-hexanediol, 1,2-propanediol, 1,3-propanediol, 2-methyl-1,3-propanediol, tetrahydrofuran, diethylene glycol, and combinations thereof.

In one example of the co-solvent system in the ink, the glycerol is present in an amount of about 12 wt %, and the ethoxylated glycerol is present in an amount of about 4 wt %. In another example of the co-solvent system in the ink, the glycerol is present in an amount of about 9 wt %, and the ethoxylated glycerol is present in an amount of about 3 wt %. In still another example, the co-solvent system in the ink consists of the glycerol present in an amount ranging from about 12 wt % to about 16 wt % based on the total weight of the ink, and the water soluble or water miscible organic solvent.

Examples of the ink disclosed herein may also include additive(s), such as a surfactant, a chelating agent, a buffer, a biocide, and combinations thereof.

In an example, the total amount of surfactant(s) in the thermal inkjet dye sublimation ink ranges from about 0 wt % to about 2 wt % (with respect to the weight of the thermal inkjet dye sublimation ink). In another example, the surfactant is present in an amount of 1 wt % or less. The surfactant(s) may be included in the thermal inkjet dye sublimation ink to aid in jettability, control the viscosity, to improve the lubricity, and to prevent agglomeration of the dispersed dye solids. Examples of suitable surfactants include oleth-3-phosphate, non-ionic, low foaming surfactants, such as ethoxylated 2,4,7,9-tetramethyl 5 decyn-4,7-diol (commercially available as SURFYNOL® 465 (HLB 13) from Evonik Industries) and other ethoxylated surfactants (commercially available as SURFYNOL® 440 (HLB 8) from Evonik Industries), or secondary alcohol ethoxylates (commercially available as TERGITOL® 15-S-7 (HLB 12.1), TERGITOL® 15-S-9 (HLB 12.6), etc. from The Dow Chemical Co.). In an example, the surfactant is oleth-3-phosphate, ethoxylated 2,4,7,9-tetramethyl 5 decyn-4,7-diol, or combinations thereof. In some examples, it has been found that the combination of SURFYNOL® 465 and SURFYNOL® 440, together or also in combination with the oleth-3-phosphate, may contribute to the synergistic effects of the inks disclosed herein in terms of wetting.

When oleth-3-phosphate is included, it may be present in an amount ranging from about 0.1 wt % to about 0.75 wt % based on the total weight of the ink. In an example, the oleth-3-phosphate is present in an amount ranging from about 0.2 wt % to about 0.5 wt % based on the total weight of the ink. Oleth-3-phosphate is commercially available as CRODAFOS™ O3A or CRODAFOS™ N-3 acid from Croda. It is believed that the oleth-3-phosphate may aid the chelating agent (when included) in effectively trapping high levels of metal ions present in the ink (e.g., from the colorant dispersion), and that the chelating agent (when included) keeps the oleth-3-phosphate from precipitating out of the ink. This combination may contribute to the significant and unexpected reduction in kogation in the thermal inkjet printhead. Kogation refers to the deposit of dried ink on a heating element of a thermal inkjet printhead, and the combination of the oleth-3-phosphate with the chelating agent assists in preventing the buildup of kogation and extending the life of the printhead.

The chelating agent is another example of an additive that may be included in the ink. When included, the chelating agent is present in an amount greater than 0 wt % actives and less than 0.1 wt % actives based on the total weight of the ink. In an example, the chelating agent is present in an amount ranging from about 0.04 wt % actives to about 0.08 wt % actives based on the total weight of the ink. The wt % actives of the chelating agent accounts for the loading (as a weight percent) of the active chelator/chelating agent present in the ink, and does not account for the weight of other components of the chelating agent solution (e.g., water) in the inkjet ink.

In an example, the chelating agent is selected from the group consisting of methylglycinediacetic acid, trisodium salt; 4,5-dihydroxy-1,3-benzenedisulfonic acid disodium salt monohydrate; ethylenediaminetetraacetic acid (EDTA); hexamethylenediamine tetra(methylene phosphonic acid), potassium salt; and combinations thereof. Methylglycinediacetic acid, trisodium salt ($Na_3MGDA$) is commercially available as TRILON® M from BASF Corp. 4,5-dihydroxy-1,3-benzenedisulfonic acid disodium salt monohydrate is commercially available as TIRON™ monohydrate. Hexamethylenediamine tetra(methylene phosphonic acid), potassium salt is commercially available as DEQUEST® 2054 from Italmatch Chemicals.

The surfactant and chelating agent, and their respective amounts, may depend, in part, on the colorant dispersion that is included in the ink. In an example, the ink is a black ink or a magenta ink, the chelating agent is present in an amount greater than 0 wt % actives and less than 0.1 wt % actives based on the total weight of the ink, and the surfactant is a combination of oleth-3-phosphate and ethoxylated 2,4,7,9-tetramethyl 5 decyn-4,7-diol. In another example, the ink is a cyan ink or a yellow ink, the chelating agent is present in an amount greater than 0 wt % actives and less than 0.1 wt % actives based on the total weight of the ink, and the surfactant is ethoxylated 2,4,7,9-tetramethyl 5 decyn-4,7-diol.

In an example, the pH of the thermal inkjet dye sublimation ink ranges from about 7 to about 9.5 at the time of manufacture. In another example, the pH of the thermal inkjet dye sublimation ink ranges from about 8 to about 9 at the time of manufacture. pH adjuster(s), such as a buffer, may be added to the ink to counteract any slight pH drop that may occur over time. The pH may drop from about 0.5 units to about 1 unit over time after being manufactured. As such, the pH of the inks disclosed herein may be lower than the ranges set forth herein, depending, in part, upon how much time has passed since manufacture. In an example, the total amount of buffer(s) in the ink ranges from 0 wt % to about 0.5 wt % (with respect to the weight of the thermal inkjet dye sublimation ink). In another example, the total amount of buffer(s) in the ink is about 0.1 wt % (with respect to the weight of the thermal inkjet dye sublimation ink). Examples of some suitable buffers include TRIS (tris(hydroxymethyl) aminomethane or Trizma), bis-tris propane, TES (2-[(2-Hydroxy-1,1-bis(hydroxymethyl)ethyl)amino]ethanesulfonic acid), MES (2-ethanesulfonic acid), MOPS (3-(N-morpholino)propanesulfonic acid), HEPES (4-(2-hydroxyethyl)-1-piperazineethanesulfonic acid), DIPSO (3-(N,N-Bis[2-hydroxyethyl]amino)-2-hydroxypropanesulfonic acid), Tricine (N-[tris(hydroxymethyl)methyl]glycine), HEPPSO (β-Hydroxy-4-(2-hydroxyethyl)-1-piperazinepropanesulfonic acid monohydrate), POPSO (Piperazine-1,4-bis(2-hydroxypropanesulfonic acid) dihydrate), EPPS (4-(2-Hydroxyethyl)-1-piperazinepropanesulfonic acid, 4-(2-Hydroxyethyl)piperazine-1-propanesulfonic acid), TEA (triethanolamine buffer solution), Gly-Gly (Diglycine), bicine (N,N-Bis(2-hydroxyethyl)glycine), HEPBS (N-(2-Hydroxyethyl)piperazine-N'-(4-butanesulfonic acid)), TAPS ([tris(hydroxymethyl)methylamino]propanesulfonic acid), AMPD (2-amino-2-methyl-1,3-propanediol), TABS (N-tris(Hydroxymethyl) methyl-4-aminobutanesulfonic acid), or the like.

In an example, the total amount of biocide(s) in the thermal inkjet dye sublimation ink ranges from about 0 wt % actives to about 0.5 wt % actives (with respect to the weight of the thermal inkjet dye sublimation ink). In another example, the total amount of biocide(s) in the inkjet ink composition is about 0.001 wt % actives to about 0.1 wt % actives (with respect to the weight of the thermal inkjet dye sublimation ink). The wt % actives of the biocide accounts for the loading (as a weight percent) of the active biocidal agent present in the ink, and does not account for the weight of other components of the biocide (e.g., water) in the inkjet ink.

Examples of suitable biocides include the NUOSEPT® (Ashland Inc.), UCARCIDE™ or KORDEK™ or ROCIMA™ (Dow Chemical Co.), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof.

It is to be understood that water is not considered a solvent or co-solvent in the inks disclosed herein, but rather is present in addition to the co-solvent system (or primary and secondary co-solvent(s)) and makes up a balance of the ink. As such, the weight percentage of the water present in the thermal inkjet dye sublimation inks will depend, in part, upon the weight percentages of the other components. The water may be purified or deionized water.

A thermal inkjet printhead uses a certain minimum energy to fire ink drops of the proper volume (herein called the turn-on energy). To accommodate various manufacturing tolerances, it may be desirable to deliver more energy to the average printhead than is required to fire it (called "over-energy") in order to allow for any uncertainty. However, it has been found that the inks disclosed herein can be printed at an operating energy that includes a margin over the turn-on energy (TOE) for the printhead, wherein the margin ranges from about 10% to about 25% over the TOE. In an example, the margin is about 15% over the TOE. The low over-energy printing may also contribute to the improved performance of the cyan inks disclosed herein. As such, examples of the printing method 100 may include applying to a heating resistor of the thermal inkjet printhead an operating energy that includes a margin over a turn-on energy (TOE) for the printhead, wherein the margin ranges from about 10% to about 25% over the TOE.

a. Example Cyan Dye Sublimation Ink

These examples of a cyan dye sublimation ink may be particularly suitable for thermal inkjet printing, in part because they include either a chelating agent or a specific combination of the chelating agent and oleth-3-phosphate (a jetting agent). It has unexpectedly been found that the chelating agent alone, or in combination with the oleth-3-phosphate, at very low levels (in total, less than 1 wt % of the inks) are able to counteract high valence (2+, 3+) metal salts and other organic impurities introduced from the cyan disperse dye colorant dispersion that could otherwise deleteriously affect the thermal inkjet printhead. The high valence (e.g., 2+, 3+) metal salts (e.g., iron, calcium, aluminum) are present in the example cyan inks at levels ranging from about 4 ppm to about 10 ppm, which are well above typical thermal inkjet inks. However, it has been found that the chelating agent, alone or in combination with the oleth-3-phosphate, at the low levels disclosed herein aid in making the dye sublimation ink jettable via thermal inkjet printheads and also provide substantially consistent print quality (i.e., ≤25% change in drop velocity and/or in drop weight, and in some instances ≤5% change in drop velocity and/or drop weight) over the life of the printhead (e.g., from over 100 million drops per nozzle to 1 billion drops per nozzle). It has been found that the inks disclosed herein can extend the printhead life by two to three orders of magnitude when compared to inks that do not include the specific combination of a chelating agent and oleth-3-phosphate. This means that better print quality, e.g., prints without banding, missing spaces, and/or misdirected drops, can be achieved for a longer period of time using the inks disclosed herein.

In addition to having improved jettability from a thermal inkjet printhead, it is believed that these example cyan dye sublimation inks may be particularly suitable for directly forming an image on a textile substrate, such as polyester. The solvent levels used in the inks disclosed herein are relatively low (e.g., 22 wt % or less, and in some instances 16 wt % or less), which is believed to improve the storage ability of the prints formed via the direct printing method disclosed herein. After being printed, sublimed, and re-solidified, some disperse dyes can migrate across the textile substrate or within the fibers of the textile substrate when exposed to high temperature storage conditions (e.g., 38° C.). It is believed that the reduced amount of the solvents in the cyan inks disclosed herein can contribute to a reduced amount of residual solvent in the printed image, which improves dye re-solidification and reduces dye migration during storage.

An example of the thermal inkjet dye sublimation ink disclosed herein consists of or comprises a cyan disperse dye colorant dispersion present in an amount ranging from about 1 wt % actives to about 7 wt % actives based on a total weight of the ink; glycerol present in an amount ranging from about 10 wt % to about 22 wt % based on the total weight of the ink; a water soluble or water miscible organic solvent present in an amount ranging from 0 wt % to about 7 wt % based on the total weight of the ink; a chelating agent present in an amount greater than 0 wt % actives and less than 0.1 wt % actives based on the total weight of the ink; an additive selected from the group consisting of a buffer, a biocide, a surfactant, and combinations thereof; and a balance of water. In some examples, the thermal inkjet dye sublimation ink consists of the listed components and no additional components (such as shear thinning agents, additional solvents, etc.). In other examples, the thermal inkjet dye sublimation ink comprises the listed components, and other components that do not deleteriously affect the jettability of the cyan ink via a thermal inkjet printhead may be added.

An example of a method comprises: selecting a chelating agent from the group consisting of methylglycinediacetic acid, trisodium salt; 4,5-dihydroxy-1,3-benzenedisulfonic acid disodium salt monohydrate; ethylenediaminetetraacetic acid; hexamethylenediamine tetra(methylene phosphonic acid), potassium salt; and combinations thereof; and incorporating the chelating agent into the dye sublimation ink, including a cyan disperse dye colorant dispersion present in an amount ranging from about 1 wt % actives to about 7 wt % actives based on a total weight of the ink; glycerol present in an amount ranging from about 10 wt % to about 22 wt % based on the total weight of the ink; a water soluble or water miscible organic solvent present in an amount ranging from 0 wt % to about 7 wt % based on the total weight of the ink; a chelating agent present in an amount greater than 0 wt % actives and less than 0.1 wt % actives based on the total weight of the ink; an additive selected from the group consisting of a buffer, a biocide, a surfactant, and combinations thereof; and a balance of water. When the combination of the chelating agent and the oleth-3-phosphate is used, this example of the method also includes selecting oleth-3-phosphate as the surfactant; and including the oleth-3-phosphate in an amount ranging from about 0.1 wt % to about 0.75 wt % based on the total weight of the ink.

The dye sublimation inks of these examples are jettable via thermal inkjet printheads and cartridges.

Jetting Methods

In some examples, the printed image may be generated by thermal inkjet, printing multiple thermal inkjet inks on e.g., a polyester textile fabric. When multiple thermal inkjet inks are used, each of the multiple thermal inkjet inks may be an example of the thermal inkjet ink described herein. In an example, multiple thermal inkjet inks may be used to create a multicolored print. In these examples, the multiple thermal inkjet inks may each include a different dye, which may introduce a different color to each thermal inkjet ink. The portions of print on which the thermal inkjet ink(s) are thermal inkjet printed display the color(s) of the corresponding thermal inkjet ink(s), or a color generated by mixing of two or more of the thermal inkjet inks.

In an example, the thermal inkjet printing of the thermal inkjet ink is accomplished using a thermal inkjet printer. In the thermal inkjet printer, a media handling system feeds the textile fabric through a print/image zone. In some examples, a series of advance or drive rollers (not shown) powered by a motor and gear assembly may be used to move the textile fabric from a supply tray into the print/image zone for printing. The printer may have a scan axis, and a carriage may be supported for reciprocal movement along the scan axis back and forth across the print/image zone. The carriage may support inkjet applicator(s) (i.e., cartridges, pens, etc.) that dispense the thermal inkjet ink(s) disclosed herein onto the textile fabric. The carriage is driven by a propulsion system that operates in response to control signals received from a processor.

The printer may also include a platen upon which the textile substrate/fabric 33 is transported for warming and/or radiation exposure. In some examples, the platen may be thermally conductive (e.g., copper), and thus may be heated in order to warm the textile fabric 33 to a temperature below a sublimation temperature of the inkjet ink 24. In other examples, the platen may be minimally- or non-thermally conductive (e.g., stainless steel, glass, etc.) In these other examples, when warming is desirable, the source 36 may be used for warming; and/or source 28 or another heat source (e.g., heating pads adjacent to the platen) may be used for warming.

It is to be understood that the dye sublimation inks may also be suitable for, or formulated to be suitable for jetting via piezoelectric inkjet printheads. When intended for piezoelectric printing, the amount of the water soluble or water miscible co-solvent/secondary solvent may be greater than or equal to 50 wt %, based on the total weight of the dye sublimation inkjet ink. Also, the amount of water included in the dye sublimation inkjet ink may vary, depending upon the amounts of the other inkjet ink components. As an example, thermal inkjet compositions may include more water than piezoelectric inkjet compositions.

Further, the total solids content of the inkjet ink composition may be variable depending on the intended use of the inkjet ink. In an example, the inkjet ink composition is a thermal inkjet dye sublimation inkjet ink, and has a solids content ranging from about 2 wt % to about 8 wt % based on the total weight of the thermal inkjet ink. In another example, the inkjet ink composition is a piezoelectric inkjet dye sublimation inkjet ink, and has a solids content ranging from about 10 wt % to about 25 wt % based on the total weight of the piezoelectric inkjet ink. The solids content impacts the viscosity. Where the ink composition is intended for use with thermal inkjet printheads, the viscosity of the ink as measured at ambient conditions (e.g., 25° C., 1 atm) may be less than or equal to 6 centipoise (cP). However, where the ink composition is intended for use with piezoelectric printheads, the viscosity of the ink as measured at ambient conditions may be greater than or equal to 10 cP.

To further illustrate the present disclosure, examples are given herein. It is to be understood that these examples are provided for illustrative purposes and are not to be construed as limiting the scope of the present disclosure.

EXAMPLES

Four sample dye sublimation inkjet inks (black, cyan, magenta, and yellow) were used. The formulations for these sample inks are shown in Table 1.

In Table 1, the weight percentages given for the dye dispersion, the chelating agent, and the biocides represent wt % actives in the ink formulations.

TABLE 1

| Ingredient | Specific Component | Black (wt %) | Cyan (wt %) | Magenta (wt %) | Yellow (wt %) |
|---|---|---|---|---|---|
| Dye Dispersion | Black Dispersion | 4 | N/A | N/A | N/A |
|  | Cyan Dispersion | N/A | 4.4 | N/A | N/A |
|  | Magenta Dispersion | N/A | N/A | 5 | N/A |
|  | Yellow Dispersion | N/A | N/A | N/A | 3.7 |
| Solvent | Glycerol | 12 | 16 | 12 | 12 |
|  | Ethoxylated Glycerol | 4 | N/A | 4 | 4 |
| Surfactant | SURYNOL ® 465 | 0.5 | 0.5 | 0.5 | 0.5 |
| Jetting Aid (surfactant) | Oleth-3-Phosphate | 0.2 | N/A | 0.2 | N/A |
| Chelating Agent | TRILON ® M | 0.04 | 0.04 | 0.04 | 0.04 |
| Buffer | TRIS | 0.1 | 0.1 | 0.1 | 0.1 |
| Biocide | ACTICIDE B20 | 0.0045 | 0.0045 | 0.0045 | 0.0045 |
|  | ACTICIDE M20 | 0.0095 | 0.0095 | 0.0095 | 0.0095 |
| Water |  | Balance | Balance | Balance | Balance |

A cesium tungsten oxide (CTO) active agent was used. The formulation for the CTO active agent is shown in Table 2, with the wt % of each component that was used.

TABLE 2

| Component | Weight % |
|---|---|
| 1-(2-hydroxyethyl)-2-pyrrolidone | 25 |
| TERGITOL ® 15S30 | 0.2 |
| Betaine | 10 |
| Cesium tungsten oxide | 8 |
| Water | balance |

Example 1

A solid color (i.e., not a mixture of two or more colors) magenta dye sublimation inkjet ink (from Table 1) was digitally printed using an HP 831 thermal inkjet color printhead onto an Aberdeen 6243-60 fabric (100% polyester). From another print cartridge in the HP 831 thermal inkjet color printhead, the CTO active agent (from Table 2) was printed on top of the magenta ink at varying levels (from 0% to 100%) of concentration/loading (with respect to a total volume of the magenta ink printed). An A4025 (12 ng) thermal inkjet pen was used to print the inkjet ink at a 3 drop per pixel (dpp) ink flux, and an A4049 (9 ng) thermal inkjet pen was used to print the active agent at a 3 drop per pixel (dpp) ink flux. The printing conditions were 70% ink, 4 passes, no print zone heat, and no curing.

There were no jet-ability issues and no ink compatibility issues.

After printing, the textile fabric swatches were exposed to IR radiation (except for the swatch having 100% CTO active agent (with respect to a total volume of the magenta ink printed). The condition set is shown in Table 3 below.

TABLE 3

| Parameter | Value |
|---|---|
| Pre-heat rate | 50° C./minute |
| Ramp up temperature | 130° C. |
| Warming time | 3 seconds |
| Lamp intensity | 100% |
| IR Flash duration | 5 seconds |
| Temperature range | 150° C.-210° C. |

Figure 3:
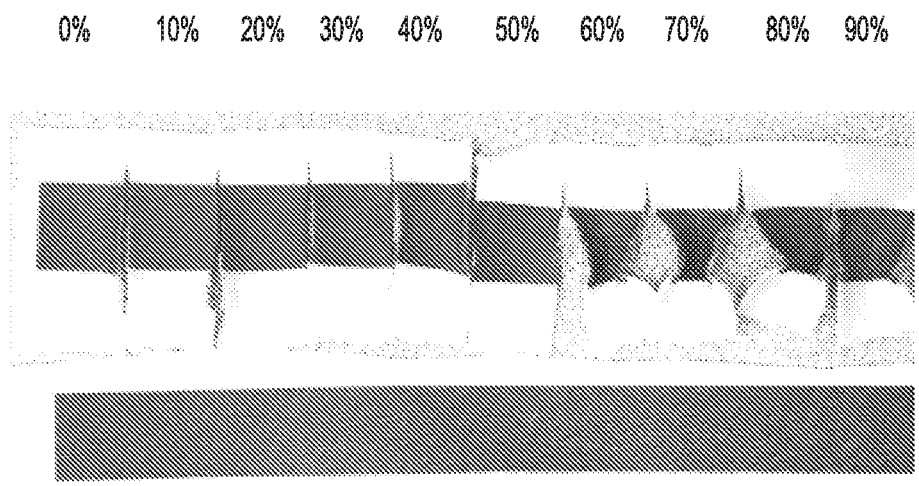
FIG. 3 is a black and white reproduction of an originally colored photograph of textile swatches printed with a dye sublimation inkjet ink and varying amounts of an active agent and then exposed to infrared radiation (top row of swatches), or then not exposed to infrared radiation (bottom swatch)

The swatches after IR exposure are shown in FIG. 3 (top row of swatches). The bottom swatch (having the magenta ink and 0%-90% of the CTO active agent) was not exposed to infrared radiation.

Figure 4:
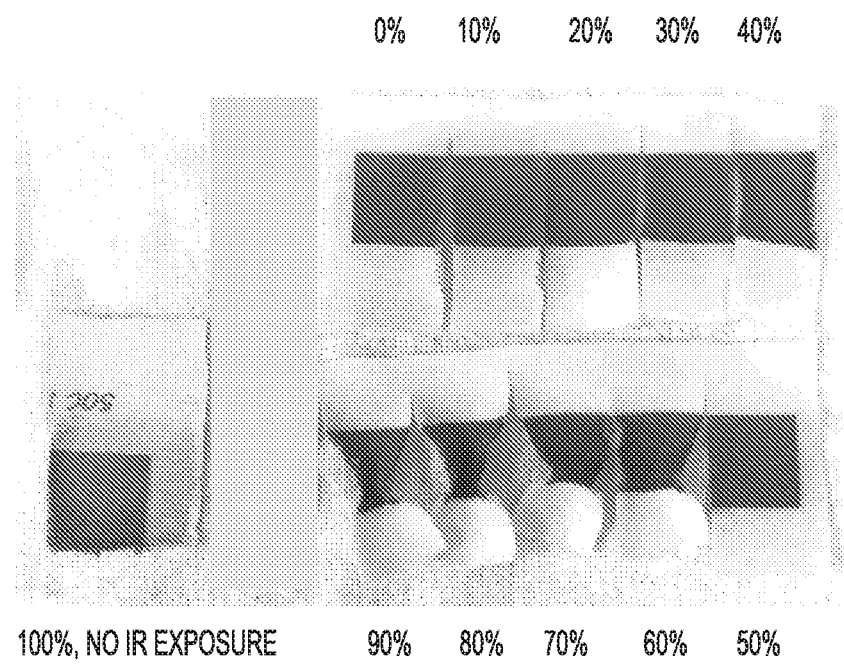
FIG. 4 is a black and white reproduction of an originally colored photograph of textile swatches printed with a dye sublimation inkjet ink and varying amounts of an active agent and then exposed to infrared radiation (swatches on the right), or then not exposed to infrared radiation (swatch on the far left), and then subjected to a water fastness test.

The swatches from the top row of FIG. 3 (IR exposed) were then subjected to water spray to determine if the dye had been sublimated (see swatches on the right side of FIG. 4). If the color is not sublimated, it migrates (bleeds) into the areas next to the print. A swatch containing magenta ink and 100% of the CTO active agent (but not exposed to IR radiation) was also subjected to water spray (see swatch at the far left side of FIG. 4).

The fabric swatches were inspected visually, and the results of the visual observations after the IR exposure and water spray test are shown in Table 4 below.

TABLE 4

| Active Agent loading (%)/ exposed to IR (Yes/No) | Sublimation (Yes/No) | Deformation of fabric (Yes/No/Slight) | Color change (Yes/No) | Color Bleed after water (1 = best, 5 = worst) |
|---|---|---|---|---|
| 0%/Yes | No | No | No | 3 |
| 0%/No | No | No | No | * |
| 10%/Yes | Yes | No | Yes | 2 |
| 10%/No | No | No | No | * |
| 20%/Yes | Yes | No | Yes | 1 |
| 20%/No | No | No | No | * |
| 30%/Yes | Yes | No | Yes | 1 |
| 30%/No | No | No | No | * |
| 40%/Yes | Yes | Slight | Yes | 1 |
| 40%/No | No | No | No | * |
| 50%/Yes | Yes | Slight | Yes | 1 |
| 50%/No | No | No | No | * |
| 60%/Yes | Yes | Yes | Yes | 1 |
| 60%/No | No | No | No | * |
| 70%/Yes | Yes | Yes | Yes | 1 |
| 70%/No | No | No | No | * |
| 80%/Yes | Yes | Yes | Yes | 1 |
| 80%/No | No | No | No | * |
| 90%/Yes | Yes | Yes | Yes | 1 |
| 90%/No | No | No | No | * |
| 100%/No | No | No | No | Yes/5 |

*Not subjected to water spray

Depending on the amount of active agent, the sample fabric swatches performed differently. The control (no exposure to IR radiation) did not sublimate while all other samples (except for the swatch having 0% CTO active agent) showed that sublimation occurs. Beyond about 40% to 50% active agent loading (with respect to a total volume of the magenta ink printed), the polyester fabric deforms drastically. It is believed that this is due, at least in part to too much heat generation. A color change (that is typical of post-sublimation) is evident on the IR exposed fabric swatches (but not on the non-IR exposed control). The color change shows a change from a dull, violet color to a bright, vibrant red/magenta color.

The non-IR exposed swatch (100% active agent) did not sublimate, and the colorant bled upon exposure to water. The IR exposed swatch (0% active agent) also did not sublimate and showed some bleeding upon exposure to water.

Example 2

Four solid color 100% dye sublimation inks Cyan (C), Magenta (M), Yellow (Y), and Black (K), from Table 1) were digitally printed using an HP 831 thermal inkjet color printhead onto an Aberdeen 6243-60 fabric (100% polyester). From another print cartridge in the HP 831 thermal inkjet color printhead, the CTO active agent (from Table 2) was printed on top of the 4 respective inks at varying levels (from 0% to 100%) of concentration/loading (with respect to a total volume of the respective ink printed). The printing conditions were 70% ink, 4 passes, no print zone heat, and no curing.

After printing, the textile fabric swatches were exposed to IR radiation. The condition set is shown in Table 5 below.

TABLE 5

| Parameter | Value |
| --- | --- |
| Pre-heat rate | 50° C./minute |
| Ramp up temperature | 130° C. |
| Warming time | 3 seconds |
| Lamp intensity | 100% |
| IR Flash duration | 3 seconds |
| Temperature range | 150° C.-210° C. |

Figure 5:
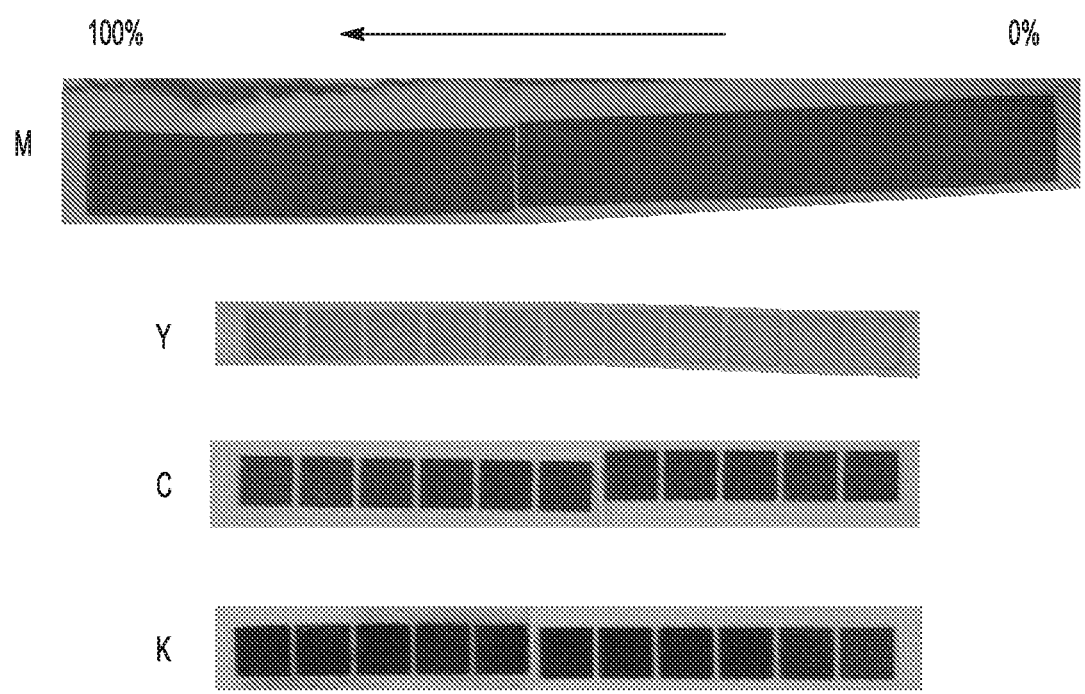
FIG. 5 is a black and white reproduction of an originally colored photograph of textile swatches printed with four dye sublimation inkjet inks (magenta, yellow, cyan and black, top to bottom) and varying amounts of an active agent and then exposed to infrared radiation (bottom three rows of swatches), or then not exposed to infrared radiation (top swatch).

The swatches after IR exposure are shown in FIG. 5. The top row of swatches has been printed with the magenta ink, the second row of swatches has been printed with the yellow ink, the third row of swatches has been printed with the cyan ink, and the fourth row of swatches has been printed with the black ink. The CTO active agent varying levels (from 0% to 100%) is shown in FIG. 5, with the far right being 0%, and the far left being 100% for each of the 4 colored printed inks.

The fabric swatches were inspected visually, and the results of the visual observations after the IR exposure are shown in Table 6 below.

TABLE 6

| Active Agent loading (%)/ Color (CMYK) | Sublimation (Yes/No) | Deformation of fabric (Yes/No/Slight) | Color change (Yes/No) |
| --- | --- | --- | --- |
| 0%/M | No | No | No |
| 0%/Y | No | No | No |
| 0%/C | No | No | No |
| 0%/K | No | No | No |
| 10%/M | Yes | No | Yes |
| 10%/Y | Yes | No | Yes |
| 10%/C | Yes | No | Yes |
| 10%/K | Yes | No | Yes |
| 20%/M | Yes | No | Yes |
| 20%/Y | Yes | No | Yes |
| 20%/C | Yes | No | Yes |
| 20%/K | Yes | No | Yes |
| 30%/M | Yes | No | Yes |
| 30%/Y | Yes | No | Yes |
| 30%/C | Yes | No | Yes |

TABLE 6-continued

| Active Agent loading (%)/ Color (CMYK) | Sublimation (Yes/No) | Deformation of fabric (Yes/No/Slight) | Color change (Yes/No) |
| --- | --- | --- | --- |
| 30%/K | Yes | No | Yes |
| 40%/M | Yes | No | Yes |
| 40%/Y | Yes | No | Yes |
| 40%/C | Yes | No | Yes |
| 40%/K | Yes | No | Yes |
| 50%/M | Yes | No | Yes |
| 50%/Y | Yes | No | Yes |
| 50%/C | Yes | No | Yes |
| 50%/K | Yes | No | Yes |
| 60%/M | Yes | No | Yes |
| 60%/Y | Yes | No | Yes |
| 60%/C | Yes | No | Yes |
| 60%/K | Yes | No | Yes |
| 70%/M | Yes | No | Yes |
| 70%/Y | Yes | No | Yes |
| 70%/C | Yes | No | Yes |
| 70%/K | Yes | No | Yes |
| 80%/M | Yes | No | Yes |
| 80%/Y | Yes | No | Yes |
| 80%/C | Yes | No | Yes |
| 80%/K | Yes | No | Yes |
| 90%/M | Yes | No | Yes |
| 90%/Y | Yes | No | Yes |
| 90%/C | Yes | No | Yes |
| 90%/K | Yes | No | Yes |
| 100%/M | Yes | No | Yes |
| 100%/Y | Yes | No | Yes |
| 100%/C | Yes | No | Yes |
| 100%/K | Yes | No | Yes |

This experiment confirmed that all 4 CMYK colors sublimate if the active agent (as low as 10% with respect to a total volume of the respective ink printed) is present and then exposed to sufficient IR radiation. As such, there was no need for post-processing. There was little or no deformation of the textile fabric swatches detected. It is believed that this may be due, at least in part to the reduced duration (2 seconds fewer) of exposing of the fabric (having the ink and active agent thereon) to IR.

Since application of the active agent may affect the color properties of a printed textile, in an example, the active agent volume applied is kept low (e.g., from about 10% to about 20%, relative to a total volume of the dye sublimation inkjet ink printed onto the textile fabric) to preserve desirable color quality. Further, it is more efficient in terms of ink usage to use less of the active agent.

It is to be understood that the ranges provided herein include the stated range and any value or sub-range within the stated range, as if the value(s) or sub-range(s) within the stated range were explicitly recited. For example, from about 10% to about 30% should be interpreted to include not only the explicitly recited limits of from about 10% to about 30%, but also to include individual values, such as about 12%, about 15%, about 27.2%, etc., and sub-ranges, such as from about 11% to about 25%, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A printing method, comprising:
selecting an inkjet ink including a dye;
selecting an active agent, including:
an electromagnetic radiation-absorbing active material; and
an aqueous or non-aqueous vehicle;
inkjet printing the inkjet ink and the active agent directly onto a textile fabric; and
exposing the textile fabric having the ink and active agent thereon to electromagnetic radiation, wherein the exposing is accomplished at an amount of time ranging from about 1 second to about 15 seconds.

2. The printing method as defined in claim 1 wherein the inkjet ink is a dye sublimation inkjet ink, and wherein the method further comprises warming the textile fabric having the ink and active agent thereon at a temperature below a sublimation temperature of the dye sublimation inkjet ink: i) before the exposing; or ii) concurrently with the exposing; or iii) both before and concurrently with the exposing.

3. A printing method, comprising:
selecting an inkjet ink including a dye;
selecting an active agent, including:
an electromagnetic radiation-absorbing active material; and
an aqueous or non-aqueous vehicle;
inkjet printing the inkjet ink and the active agent directly onto a textile fabric; and
exposing the textile fabric having the ink and active agent thereon to electromagnetic radiation;
wherein the inkjet ink is a dye sublimation inkjet ink, and wherein the method further comprises warming the textile fabric having the ink and active agent thereon at a temperature below a sublimation temperature of the dye sublimation inkjet ink: i) before the exposing; or ii) concurrently with the exposing; or iii) both before and concurrently with the exposing;
and wherein the temperature at which the textile fabric is warmed ranges from about 110° C. to about 150° C.

4. A printing method, comprising:
selecting an inkjet ink including a dye;
selecting an active agent, including:
an electromagnetic radiation-absorbing active material; and
an aqueous or non-aqueous vehicle;
inkjet printing the inkjet ink and the active agent directly onto a textile fabric; and
exposing the textile fabric having the ink and active agent thereon to electromagnetic radiation;
wherein the inkjet ink is a dye sublimation inkjet ink, and wherein the method further comprises warming the textile fabric having the ink and active agent thereon at a temperature below a sublimation temperature of the dye sublimation inkjet ink: i) before the exposing; or ii) concurrently with the exposing; or iii) both before and concurrently with the exposing;
and wherein the warming takes place for an amount of time ranging from about 0.1 seconds to about 30 seconds.

5. A printing method, comprising:
selecting an inkjet ink including a dye;
selecting an active agent, including:
an electromagnetic radiation-absorbing active material; and
an aqueous or non-aqueous vehicle;
inkjet printing the inkjet ink and the active agent directly onto a textile fabric; and
exposing the textile fabric having the ink and active agent thereon to electromagnetic radiation;
wherein:
the inkjet ink is a dye sublimation inkjet ink;
the active agent is applied directly onto the textile fabric before the dye sublimation inkjet ink is applied; and
the method further comprises warming the textile fabric having the active agent thereon at a temperature below a sublimation temperature of the dye sublimation inkjet ink: i) before the dye sublimation inkjet ink is applied; and ii) before the exposing.

6. The printing method as defined in claim 1 wherein the inkjet ink is a dye sublimation inkjet ink, and wherein the exposing takes place for an amount of time sufficient to raise a temperature of the textile fabric having the dye sublimation inkjet ink and the active agent thereon to between about 150° C. and about 210° C.

7. The printing method as defined in claim 1 wherein the electromagnetic radiation to which the textile fabric is exposed has a wavelength ranging from about 700 nm to about 1 mm.

8. The printing method as defined in claim 1 wherein the electromagnetic radiation-absorbing active material is selected from the group consisting of an infrared light absorber, a near-infrared light absorber, a plasmonic resonance absorber, and combinations thereof.

9. The printing method as defined in claim 8 wherein the electromagnetic radiation-absorbing active material comprises the plasmonic resonance absorber.

10. The printing method as defined in claim 9 wherein the plasmonic resonance absorber comprises an inorganic pigment selected from the group consisting of lanthanum hexaboride, tungsten bronzes, indium tin oxide, antimony tin oxide, titanium nitride, aluminum zinc oxide, ruthenium oxide, silver, gold, platinum, iron pyroxenes, modified iron phosphates, modified copper phosphates, modified copper pyrophosphates, and combinations thereof.

11. The printing method as defined in claim 1 wherein the inkjet ink is a dye sublimation inkjet ink, and wherein an amount of the active agent printed onto the textile fabric ranges from about 1% to about 60%, relative to a total volume of the dye sublimation inkjet ink printed onto the textile fabric.

12. The printing method as defined in claim 1 wherein the textile fabric is selected from the group consisting of polyester fabrics and polyester blend fabrics.

13. The printing method as defined in claim 1 wherein the inkjet ink is a dye sublimation inkjet ink, and the method further comprises maintaining the dye sublimation inkjet ink separate from the active agent until they are inkjet printed.

14. A liquid fluid set for dye sublimation inkjet printing, comprising:
a dye sublimation inkjet ink; and
an active agent, including:
an electromagnetic radiation-absorbing active material; and
an aqueous or non-aqueous vehicle;
wherein the electromagnetic radiation-absorbing active material comprises a plasmonic resonance absorber.

15. The liquid fluid set as defined in claim 14 wherein the plasmonic resonance absorber comprises an inorganic pigment selected from the group consisting of lanthanum hexaboride, tungsten bronzes, indium tin oxide, antimony tin oxide, titanium nitride, aluminum zinc oxide, ruthenium oxide, silver, gold, platinum, iron pyroxenes, modified iron phosphates, modified copper phosphates, modified copper pyrophosphates, and combinations thereof.

16. The liquid fluid set as defined in claim 14 wherein the dye sublimation inkjet ink is kept separate from the active agent until they are inkjet printed.

* * * * *